US011126634B2

United States Patent
Addala et al.

(10) Patent No.: US 11,126,634 B2
(45) Date of Patent: Sep. 21, 2021

(54) PROVIDING ENHANCED PAGE LAYOUT REPRESENTATIONS OF DATABASE ENTRIES

(71) Applicant: Salesforce.com, Inc., San Francisco, CA (US)

(72) Inventors: Viswanadh Addala, Los Gatos, CA (US); Eric Jacobson, San Jose, CA (US); Helen Chan, San Francisco, CA (US); Sakshi Arora, San Francisco, CA (US); Brinkal Janani, San Francisco, CA (US); Dean Moses, Berkeley, CA (US); John Henton, San Francisco, CA (US); Adheip Varadarajan, Daly City, CA (US); Jan Ove Kristian Olsson, Castro Valley, CA (US); Wenqing Dai, San Francisco, CA (US)

(73) Assignee: Salesforce.com, Inc., San Francisco, CA (US)

( * ) Notice: Subject to any disclaimer, the term of this patent is extended or adjusted under 35 U.S.C. 154(b) by 378 days.

(21) Appl. No.: 16/211,527

(22) Filed: Dec. 6, 2018

(65) Prior Publication Data
US 2020/0097480 A1 Mar. 26, 2020

Related U.S. Application Data

(60) Provisional application No. 62/734,833, filed on Sep. 21, 2018, provisional application No. 62/734,841, filed on Sep. 21, 2018.

(51) Int. Cl.
*G06F 16/00* (2019.01)
*G06F 16/25* (2019.01)
(Continued)

(52) U.S. Cl.
CPC ........ *G06F 16/252* (2019.01); *G06F 3/04847* (2013.01); *G06F 16/214* (2019.01);
(Continued)

(58) Field of Classification Search
CPC ...... G06F 16/26; G06F 16/252; G06F 16/214; G06F 16/9577; G06F 40/106; G06F 3/04847; G06Q 30/01
See application file for complete search history.

(56) References Cited

U.S. PATENT DOCUMENTS

| 7,389,259 B2 * | 6/2008 | Duncan | G06Q 10/08 |
| | | | 705/14.4 |
| 2002/0174004 A1 * | 11/2002 | Wagner | G06Q 10/04 |
| | | | 705/7.25 |

(Continued)

OTHER PUBLICATIONS

Aulbach et al., "Multi-Tenant Databases for Software as a Service: Schema-Mapping Techniques", SIGMOD'08, Jun. 9-12, 2008, pp. 1195-1197. (Year: 2008).*

(Continued)

*Primary Examiner* — Cheryl Lewis
(74) *Attorney, Agent, or Firm* — Kwan & Olynick LLP

(57) ABSTRACT

An interactive database object representation may be created based on configuration instructions. The interactive database object representation may include a plurality of graphical elements that are each associated with a respective database object field. Each of the database object fields may be associated with a database object definition within a database. The interactive database object representation may be published to a storage medium for transmission upon request to a client machine via a network. The interactive database object representation may facilitate the display and editing of data associated with an instance of the database object.

17 Claims, 28 Drawing Sheets

(51) Int. Cl.
*G06F 3/0484* (2013.01)
*G06F 16/26* (2019.01)
*G06F 16/21* (2019.01)
*G06F 40/106* (2020.01)
*G06F 16/957* (2019.01)
*G06Q 30/00* (2012.01)
*G06F 3/0486* (2013.01)

(52) U.S. Cl.
CPC .......... *G06F 16/26* (2019.01); *G06F 16/9577* (2019.01); *G06F 40/106* (2020.01); *G06Q 30/01* (2013.01); *G06F 3/0486* (2013.01)

(56) References Cited

U.S. PATENT DOCUMENTS

| | | |
|---|---|---|
| 2008/0010387 A1 | 1/2008 | Curtis et al. |
| 2008/0040661 A1 | 2/2008 | Curtis et al. |
| 2011/0264650 A1* | 10/2011 | Tobin .................... G06F 16/248 707/722 |
| 2013/0212487 A1 | 8/2013 | Cote |
| 2015/0019480 A1 | 1/2015 | Maquaire et al. |
| 2020/0097562 A1 | 3/2020 | Addala |

OTHER PUBLICATIONS

Schroeter et al., "Towards Modeling a Variable Architecture for Multi-Tenant SaaS-Applications", VaMoS'12, Jan. 25-27, 2012, ACM, pp. 111-120. (Year: 2012).*
U.S. Appl. No. 16/188,350, Final Rejection, dated Aug. 6, 2020, 13 pgs.
U.S. Appl. No. 16/188,350, Non-Final Rejection, dated Jan. 24, 2020, 13 pgs.
U.S. Appl. No. 16/188,350, Non-Final Rejection, dated Dec. 2, 2020, 15 pgs.
U.S. Appl. No. 16/188,350, Examiner Interview Summary dated Jan. 28, 2021, 2 pgs.
U.S. Appl. No. 16/188,350, Examiner Interview Summary dated Mar. 4, 2021 1 pg.
U.S. Appl. No. 16/188,350, Notice of Allowance dated Mar. 4, 2021, 10 pgs.

* cited by examiner

PROVIDING ENHANCED PAGE LAYOUT REPRESENTATIONS OF DATABASE ENTRIES

CROSS-REFERENCE TO RELATED APPLICATIONS

This application claims priority to Provisional U.S. Patent Application No. 62/734,833 by Addala et al., titled "PROVIDING ENHANCED PAGE LAYOUT REPRESENTATIONS OF DATABASE ENTRIES", filed Sep. 21, 2018, and to Provisional U.S. Patent Application No. 62/734,841 by Addala et al. titled "MIGRATING Page Layout Representations of Database Entries", filed Sep. 21, 2018, both of which are hereby incorporated by reference in their entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to database systems and more specifically to techniques for constructing and presenting graphical representations of objects stored in database systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIGS. 8-27 illustrate examples of user interfaces configured in accordance with one or more embodiments.

DETAILED DESCRIPTION

Figure 1:
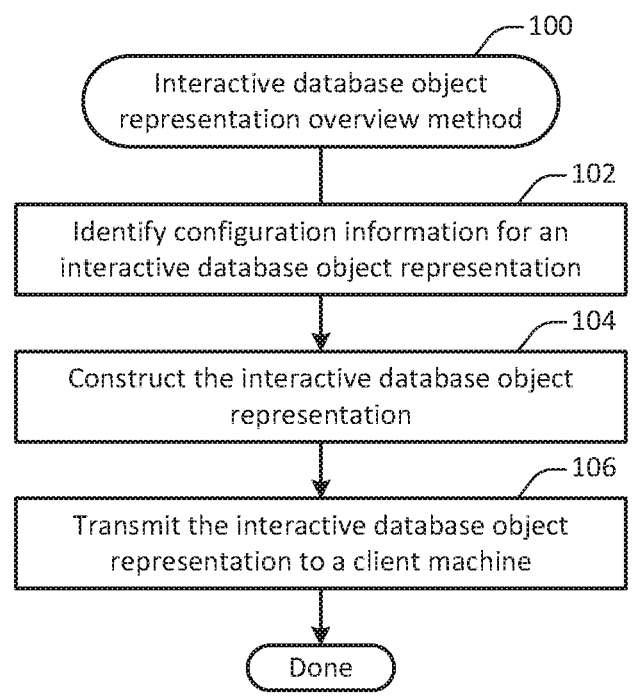
FIG. 1 illustrates an example of an overview method for providing an interactive database object representation, performed in accordance with one or more embodiments.

Databases are flexible storage structures within which can be stored data representing any of various types of real or virtual objects. For example, a database may be used to store information about customer accounts, individuals within an organization, or items sold buy a company. In part due to this flexibility, user interactions with databases can be cumbersome when employing conventional techniques.

For example, when using conventional techniques database records may be accessed in a spreadsheet-like interface, where individual records or objects are represented as rows and fields or object properties are represented as columns. However, among their other drawbacks such interfaces are difficult to use and provide poor representations of objects spanning more than one database table.

As another example, when using conventional techniques database records may be accessed via graphical user interfaces, for instance via a webpage. However, conventional interfaces for accessing database records via a webpage rely on monolithic pages in which each field of a record is represented regardless of its importance to a user. Accordingly, improved techniques for facilitating interactions between users and databases are desired.

According to various embodiments, techniques and mechanisms described herein may facilitate the efficient and effective interaction of a user with a database. In some implementations, these techniques and mechanisms may be configured to provide a user with access to an on-demand database accessible via a cloud-connected computing services environment. For example, techniques and mechanisms described herein may provide for user interaction with an on-demand multi-tenant database configured to provide computing services such as on-demand customer relations management (CRM), within-organization communication related to database records and other topics, user training, sales lead management, and other such computing services.

Consider an example of a user Alexandra who manages customer accounts represented by database records in an on-demand database system accessed via the internet. When using a system configured in accordance with conventional techniques, Alexandra employs a user interface in a webpage in which each database object is represented by a monolithic page that lists each object field. Even though Alexandra rarely edits many of these fields and rarely needs to view the values stored in other fields, each field is represented in the interface in a fixed order. Accordingly, the interface includes information that is unnecessary and distracting, while more pertinent information is occluded and difficult to access. Because the page is fixed, Alexandra cannot reconfigure the page to better suit her needs. She therefore wastes valuable time when employing the interface to interact with database records.

Now suppose instead that Alexandra employed techniques and mechanisms described herein, configured in accordance with some implementations. Using these techniques, Alexandra is able to create an interactive database object representation that suited her needs. She can specify sections to include in the interactive database object representation, and then designate fields to include in each section. She then orders the sections and the fields to prioritize the database record information that is most useful and meaningful to her. When she is happy with the appearance and functionality of the interactive database object representation, she can publish it for later use. The system then automatically configures the interactive database object representation to be accessed on devices having various capabilities and screen resolutions.

FIG. 1 illustrates an example of an overview method 100 for providing an interactive database object representation, performed in accordance with one or more embodiments. According to various embodiments, the method 100 may be performed at one or more computing devices associated with an on-demand computing services environment and in communication with a client machine.

At 102, configuration information is identified for an interactive database object representation. According to various embodiments, the configuration information may include any suitable data such as the identity of one or more database objects being represented, one or more identifiers for the interactive database object representation, and a description of the interactive database object representation. At least a portion of the configuration information may be identified in part automatically, for instance by analyzing a database schema. Alternately, or additionally, at least a portion of the configuration information may be identified based on user input, for instance by receiving user input from a client machine or a systems administrator.

At 104, the interactive database object representation is constructed. In some implementations, constructing the interactive database object representation may involve operations such as identifying sections and fields to include in the interactive database object representation, determining ordering and/or configuration information for those sections and fields, and publishing the interactive database object representation for presentation. Techniques for constructing an interactive database object representation are discussed in additional detail with respect to FIG. 4.

At 106, the interactive database object representation is transmitted to a client machine. In some embodiments, the interactive database object representation may be transmitted as all or a portion of a webpage. For example, the user may employ a web browser to view and interact with the interactive database object representation. User interaction with the interactive database object representation may involve operations such as using the interactive database object representation to add, remove, or edit information associated with a database object.

According to various embodiments, an individual database object or a collection of database objects may be associated with one or more interactive database object representations. For example, different customers of the on-demand computing services provider, different groups or entities within a customer firm, or different individuals may each create one or more customized interactive database object representation of the same underlying database objects or objects. In this way, different entities may access a database object or objects in a customized manner to better facilitate their own workflows.

Figure 2:
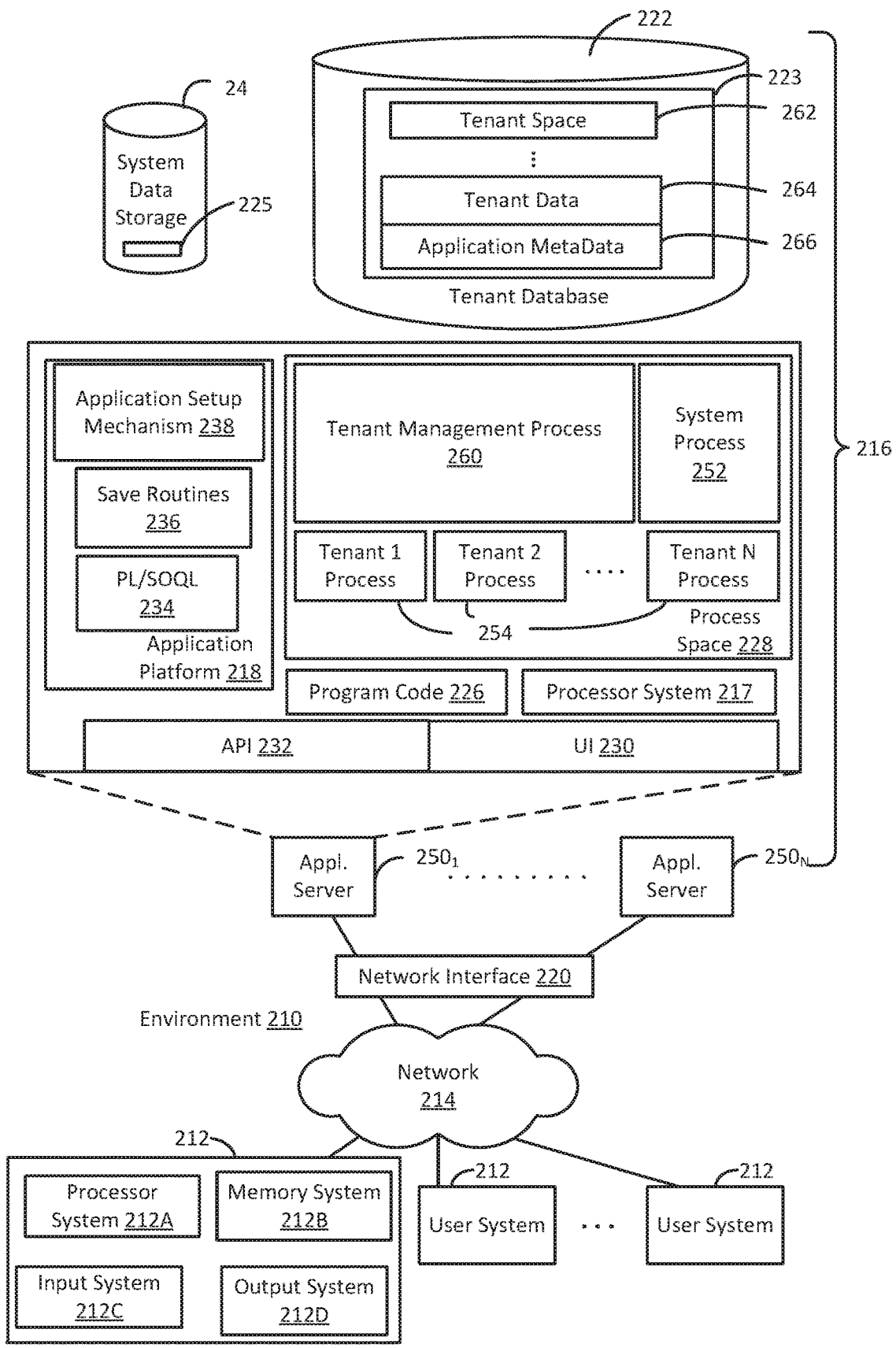
FIG. 2 shows a block diagram of an example of an environment that includes an on-demand database service configured in accordance with some implementations.

FIG. 2 shows a block diagram of an example of an environment 210 that includes an on-demand database service configured in accordance with some implementations. Environment 210 may include user systems 212, network 214, database system 216, processor system 217, application platform 218, network interface 220, tenant data storage 222, tenant data 223, system data storage 224, system data 225, program code 226, process space 228, User Interface (UI) 230, Application Program Interface (API) 232, PL/SOQL 234, save routines 236, application setup mechanism 238, application servers 250-1 through 250-N, system process space 252, tenant process spaces 254, tenant management process space 260, tenant storage space 262, user storage 264, and application metadata 266.

An on-demand database service, implemented using system 216, is managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collection of distributed databases, or any other suitable database system. A database image may include one or more database objects. A relational database management system (RDBMS) or the equivalent may execute storage and retrieval of information against these objects.

In some implementations, the application platform 18 is a framework that allows the creation, management, and execution of applications in system 216. Such applications may be developed by the database service provider or by users or third-party application developers accessing the service. Application platform 218 includes an application setup mechanism 238 that supports application developers' creation and management of applications, which may be saved as metadata into tenant data storage 222 by save routines 236 for execution by subscribers as one or more tenant process spaces 254 managed by tenant management process 260 for example. Invocations to such applications may be coded using PL/SOQL 234 that provides a programming language style interface extension to API 232. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 266 for the subscriber making the invocation and executing the metadata as an application in a virtual machine.

In some implementations, each application server 250 may handle requests for any user associated with any organization. A load balancing function (e.g., an F5 Big-IP load balancer) may distribute requests to the application servers 250 based on an algorithm such as least-connections, round robin, and observed response time. Each application server 250 may be configured to communicate with tenant data storage 222 and the tenant data 223 therein, and system data storage 224 and the system data 225 therein to serve requests of user systems 212. The tenant data 223 might be divided into individual tenant storage spaces 262, which can be either a physical arrangement and/or a logical arrangement of data. Within each tenant storage space 262, user storage 264 and application metadata 266 might be similarly allocated for each user. For example, a copy of a user's most recently used (MRU) items might be stored to user storage 264. Similarly, a copy of MRU items for an entire organization that is a tenant might be stored to tenant storage space 262. A UI 230 provides a user interface and an API 232 provides an application programmer interface to system 216 resident processes to users and/or developers at user systems 212.

In some implementations, system 216, shown in FIG. 2, implements a web-based CRM system. For example, in one implementation, system 216 includes application servers configured to implement and execute CRM software applications as well as provide related data, code, forms, web pages and other information to and from user systems 212 and to store to, and retrieve from, a database system related data, objects, and Webpage content. With a multi-tenant system, data for multiple tenants may be stored in the same physical database object in tenant data storage 222, however, tenant data may be is arranged in the storage medium(s) of tenant data storage 222 so that data of one tenant is kept logically separate from that of other tenants so that one tenant does not have access to another tenant's data, unless such data is expressly shared.

Several elements in the system shown in FIG. 2 include conventional, well-known elements that are explained only briefly here. For example, user system 212 may include processor system 212A, memory system 212B, input system 212C, and output system 212D. A user system 212 may be implemented as any computing device(s) or other data processing apparatus such as a mobile phone, laptop computer, tablet, desktop computer, or network of computing devices. User system 12 typically runs an Internet browser allowing a user (e.g., subscriber of the multi-tenant database system) of user system 212 to access, process and view information, pages and applications available to it from system 216 over network 214. Network 214 is any network or combination of networks of devices that communicate with one another, such as any one or any combination of a LAN (local area network), WAN (wide area network), wireless network, or other appropriate configuration.

The users of user systems 212 may differ in their respective capacities, and the capacity of a particular user system 212 may be determined at least in part by permissions for the current user. Different users will have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As an example of storage, one tenant might be a company that employs a sales force where each salesperson uses system 216 to manage their sales process. Thus, a user might maintain contact data, leads data, customer follow-up data, performance data, goals and progress data, etc., all applicable to that user's personal sales process (e.g., in tenant data storage 222). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems.

While each user's data might be separate from other users' data regardless of the employers of each user, some data might be organization-wide data shared or accessible by a plurality of users or all of the users for a given organization that is a tenant. Thus, there might be some data structures managed by system 216 that are allocated at the tenant level while other data structures might be managed at the user level. Because an MTS might support multiple tenants including possible competitors, the MTS should have security protocols that keep data, applications, and application use separate. In addition to user-specific data and tenant-specific data, system 216 might also maintain system level data usable by multiple tenants or other data. Such system level data might include industry reports, news, postings, and the like that are sharable among tenants.

In certain implementations, user systems 212 (which may be client systems) communicate with application servers 250 to request and update system-level and tenant-level data from system 216 that may involve sending one or more queries to tenant data storage 222 and/or system data storage 224. System 216 (e.g., an application server 250 in system 216) automatically generates one or more SQL statements (e.g., one or more SQL queries) that are designed to access the desired information. System data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 3:
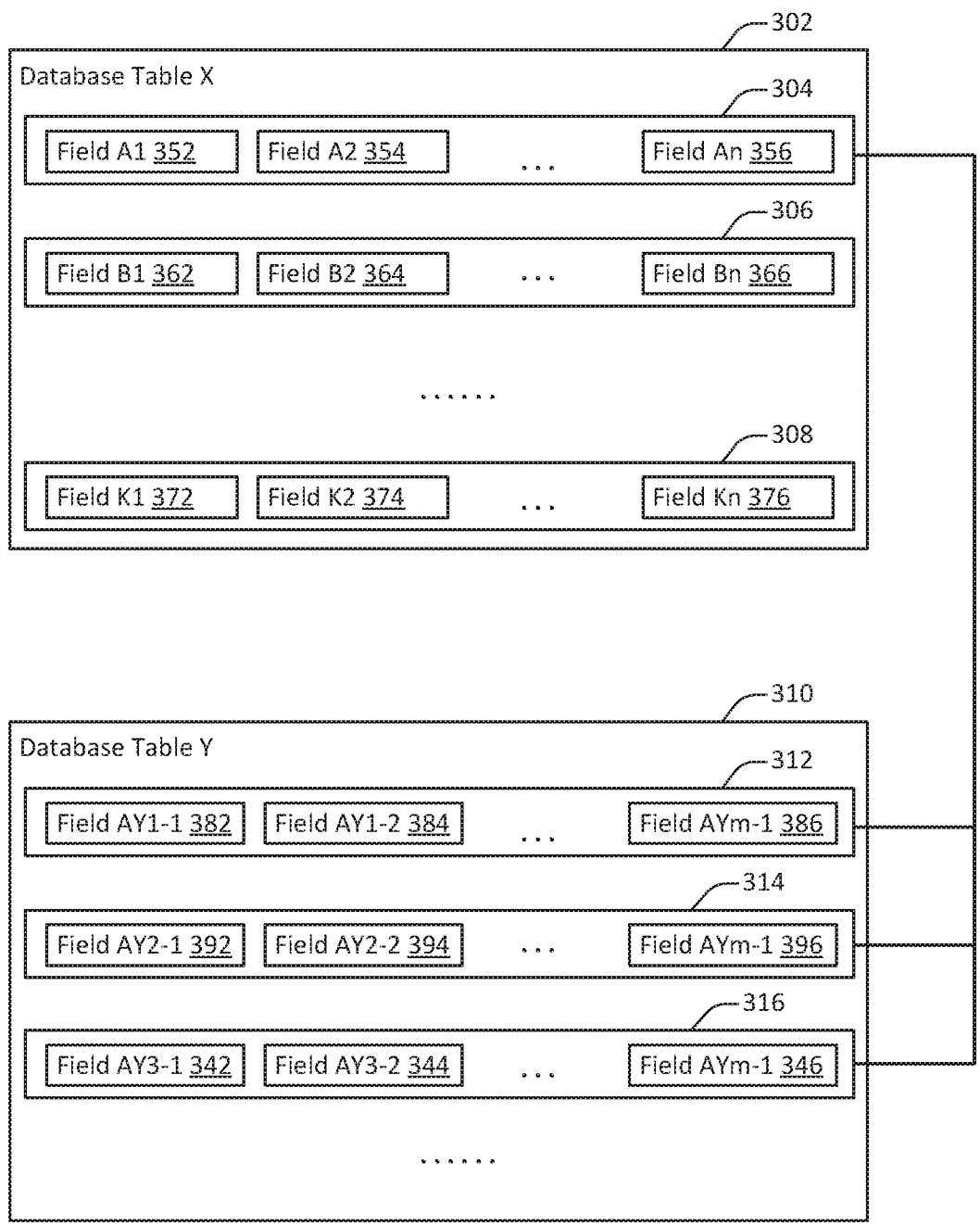
FIG. 3 illustrates an example of an arrangement of information in a database system, configured in accordance with one or more embodiments.

FIG. 3 illustrates an example of an arrangement of information in a database system, configured in accordance with one or more embodiments. The arrangement of information shown in FIG. 3 includes two tables: database table X 302 and database table Y 310. The arrangement of information shown in FIG. 3 is a substantially simplified view of how information may be arranged in an actual database, which frequently include many tables each containing many records.

The database table X 302 includes database records A 304, B 306, and K 308. Each database record includes some number of fields. For example, the database record A 304 includes the fields A1 352, A2 354, and An 356. As another example, the database record B 306 includes the fields B1 362, B2 364, and Bn 366. As yet another example, the database record C 308 includes the fields C1 372, C2 374, and Cn 376.

The database table Y 310 includes database records AY1 312, AY2 314, and AYm 316. Each database record includes some number of fields. For example, the database record AY1 312 includes the fields AY1-1 382, AY1-2 384, and AY1-$m$ 386. As another example, the database record AY1 312 includes the fields AY2-1 392, AY2-2 394, and AY3-$m$ 396. As yet another example, the database record AY3 316 includes the fields AY3-1 342, AY3-2 344, and AY3-$m$ 346.

The arrangement of information shown in FIG. 3 may represent any suitable data. According to various embodiments, the records in Table X 302 may correspond to customers in a CRM. Each field in Table X 302 may then correspond to a property associated with the customer, such as address information, expected revenue, close date, and customer type. Each record in Table Y 310 may correspond to a contact at the customer. For example, the records AY1 312, AY2 314, and AY3 316 may correspond to different contacts associated with customer A corresponding with the record 304 in Table X 302. Each field in Table Y 310 may correspond with to a property associated with the contact. For example, the fields in Table Y 310 may correspond to a contact's name, title, email address, phone number, and other such information. In this way, the arrangement of information shown in FIG. 3 may represent information characterizing customers in an extensible and orderly fashion.

In some implementations, a database system may be constructed in an extensible and configurable manner. For example, database service provider developers, CRM customers, and/or third-party developers may be able to perform any or all of a variety of operations such as adding or removing tables, adding or removing records from tables, adding or removing fields from records, adding or removing fields from tables, or any other suitable operation. In this way, the on-demand database system may be sufficiently flexible so as to accommodate a wide variety of database users and types of information.

Figure 4:
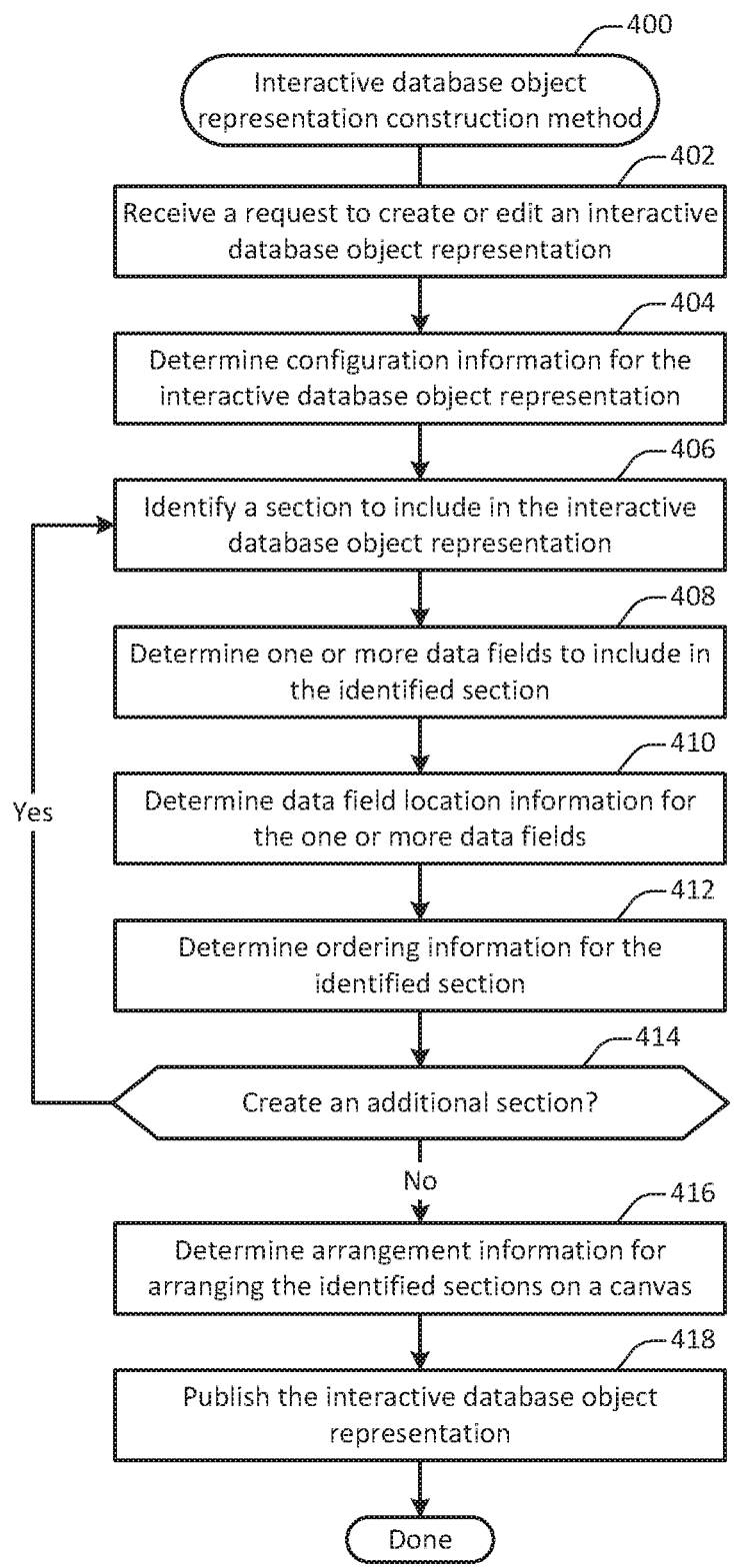
FIG. 4 illustrates an example of a method for constructing an interactive database object representation, performed in accordance with one or more embodiments.

FIG. 4 illustrates an example of a method 400 for constructing an interactive database object representation, performed in accordance with one or more embodiments. According to various embodiments, the method 400 may be performed at one or more computing devices within an on-demand computing environment. For example, the method 400 may be performed at an application server in communication with a client machine.

FIGS. 7-26 illustrate examples of user interfaces configured in accordance with one or more embodiments. Portions of the method 400 will be explained with examples drawn from these user interfaces. However, the method 400 is not limited to user interfaces similar to those shown in FIGS. 7-26.

At 402, a request is received to create or edit an interactive database object representation. In some implementations, the request may be received from a client machine. For example, the client machine may be associated with a client of an on-demand database system. The request may be included in a presentation configuration message including instructions to configure an interactive database object representation.

Figure 27:
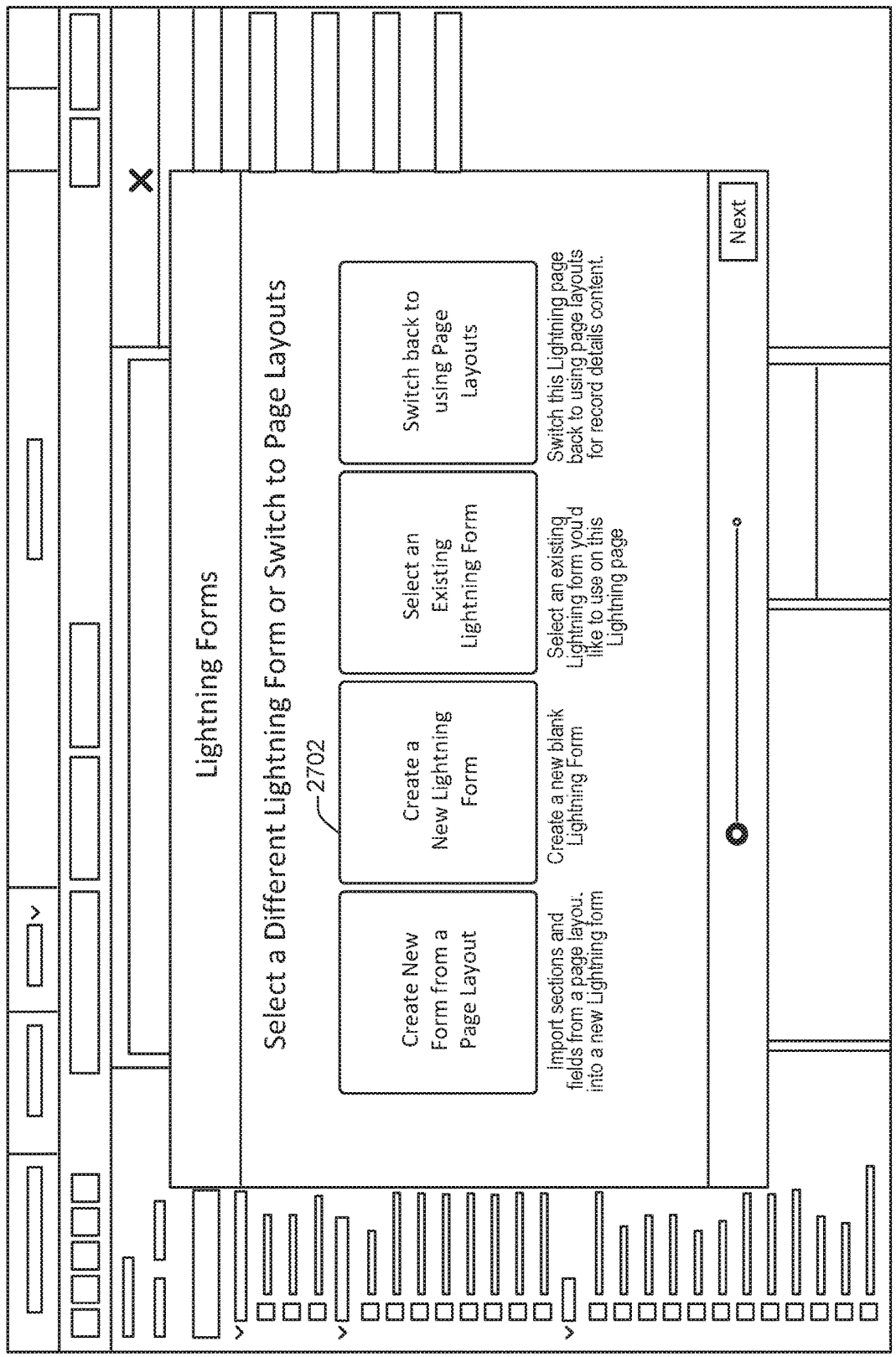

In particular embodiments, the request may be generated by clicking on an appropriate button in a user interface presented in a web browser at a client machine. For example, in the user interface shown in FIG. 27, a user may click on the button 2702 corresponding to the creation of a new form.

Configuration information for the interactive database object representation is determined at 404. In some implementations, the configuration information may be determined based at least in part on user input. For example, user input may be received from the client machine in the request received at 402 or in a subsequent message. Alternately, or additionally, the configuration information may be determined based at least in part on a dynamic determination. For example, the system may identify one or more database objects related to the interactive database object representation and automatically identify configuration information.

In some embodiments, the configuration may include one or more identifiers associated with the interactive database object representation. For example, in the user interface shown in FIG. 8, the identifiers include both a user-facing name for the form at 802 and a developer-facing name for the form at 804. The user-facing name may be displayed to the user, while the developer-facing name may be employed in computing programming code to refer to the form as a computing programming code object.

In particular embodiments, forms may be implemented in a hierarchical or connected fashion. For example, a parent form may include standard form fields, while child forms may modify the parent form by adding or removing from the standard form fields. In such a configuration, editing or attempting to edit a form may affect characteristics of the connected forms. Accordingly, an attempt to edit a connected form may cause the system to generate a warning message, such as the message 902 shown in FIG. 9. As another example, the system may generate a warning message such as the message 1002 shown in FIG. 10. In some embodiments, the system may show a list of other forms that may be affected.

At 406, a section to include in the interactive database object representation is identified. In some implementations, a section may correspond to a one or more database entries and/or fields. For example, in a CRM system, a section may correspond to a list of addresses, marketing information, partner information, customer success information, or other such data.

According to various embodiments, the section may be identified based at least in part on user input. For example, a user may select a section to include. Alternately, or additionally, the section may be identified based at least in part on an automatic determination performed by the system. For example, the system may identify a database object related to the interactive database object representation and automatically determine one or more sections based on the characteristics of the database object, such as the database fields associated with the database object.

Figure 11:
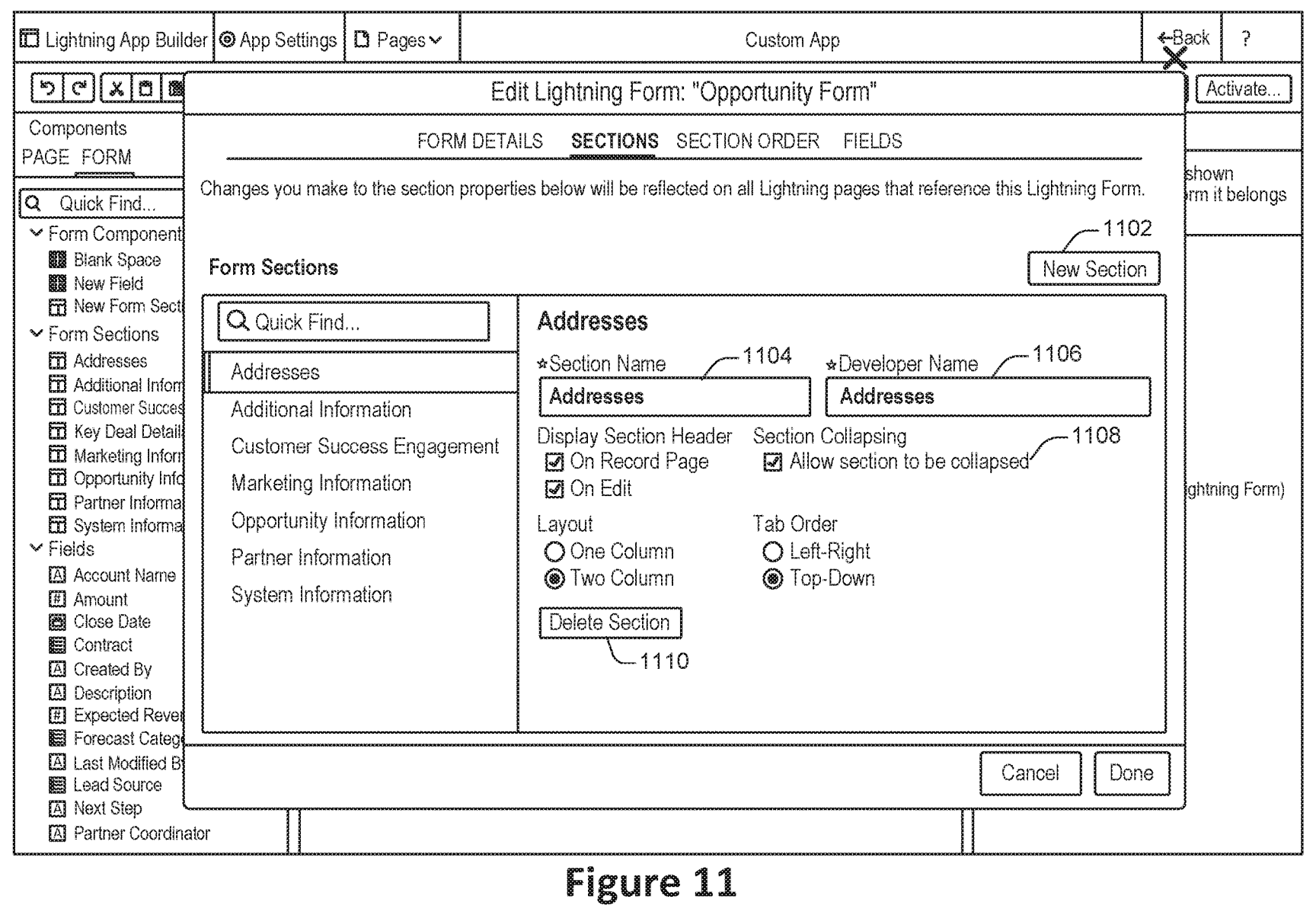

An example of a user interface in which sections may be created or edited is shown in FIG. 11. User input may be employed to create a new section at 1102, specify the user-facing section name at 1104, specify the developer-facing section name at 1106, specify various section-level options at 1108, or delete the section at 1110.

Figure 12:
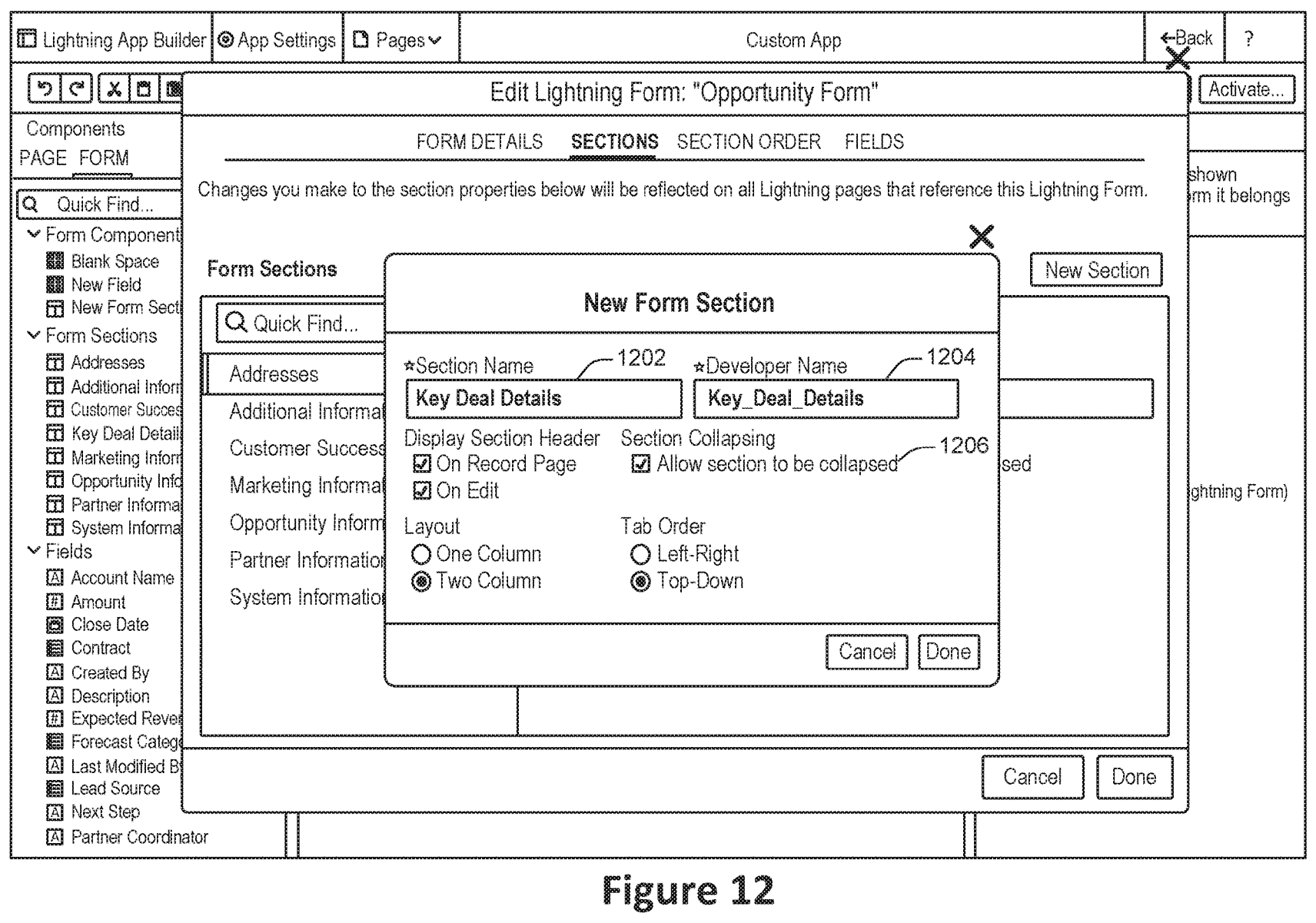

The creation of a new section at 1102 may lead to an interface such as that shown in FIG. 12. In the interface shown in FIG. 12, the user-facing section name may be specified at 1202, the developer-facing section name may be specified at 1204, and various section-level configuration information may be specified at 1206.

Figure 13:
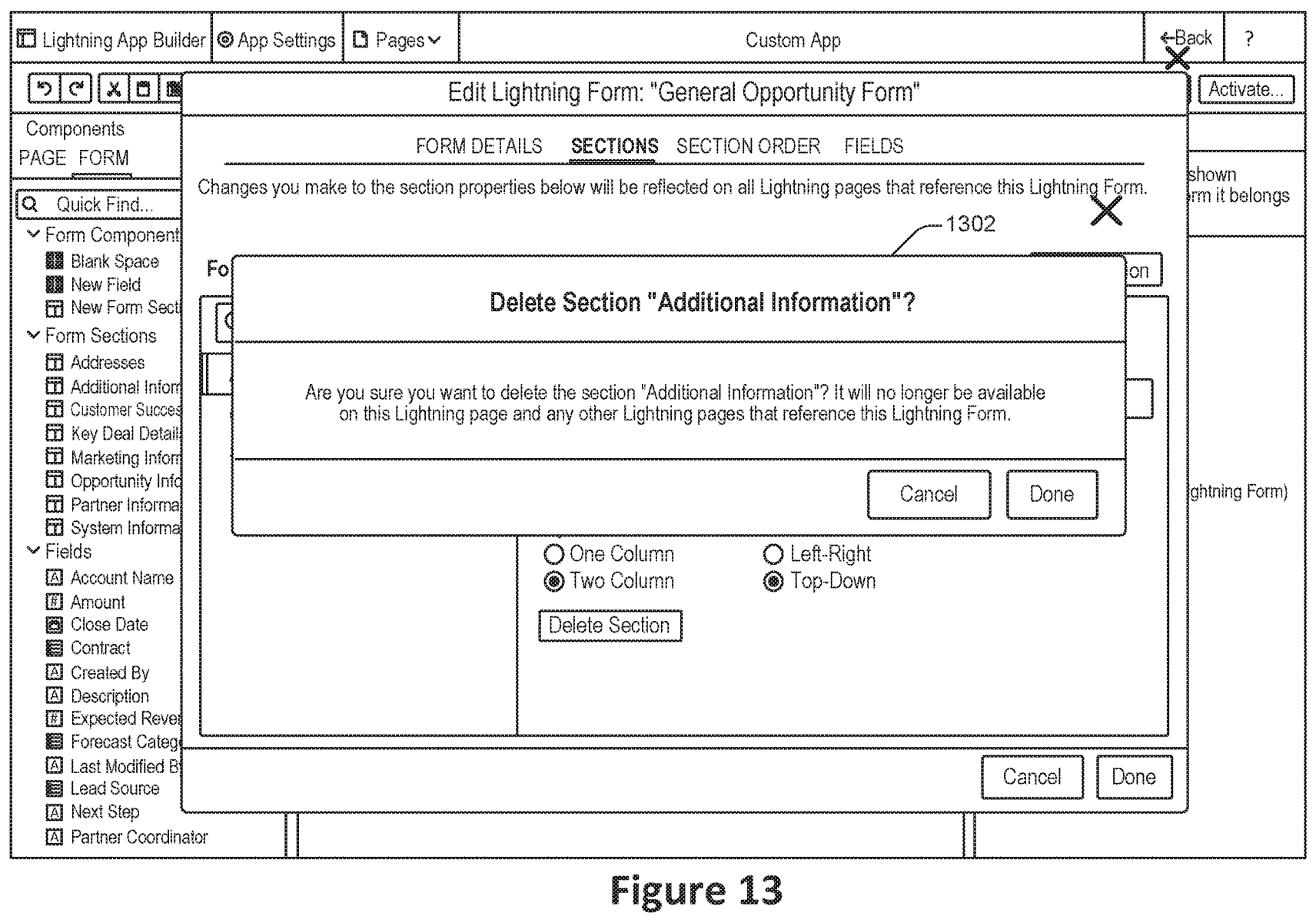
Figure 14:
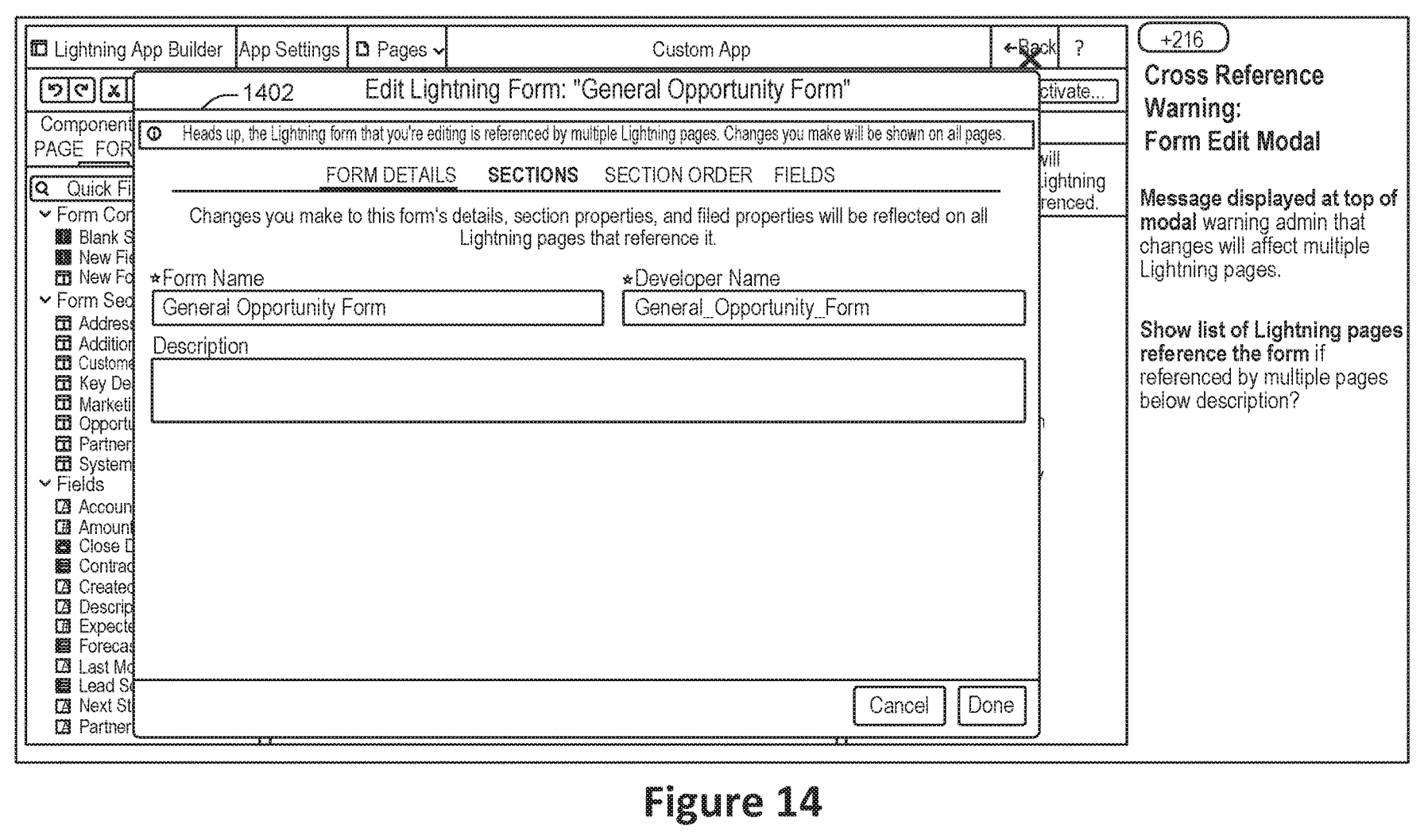

An attempt to delete a section may lead to an interface such as that shown in FIG. 13, with a confirmation dialog such as 1302. In the case of a connection section, an interface such as that shown in FIG. 14 may be presented, with a confirmation message such as that shown at 1402.

Figure 15:
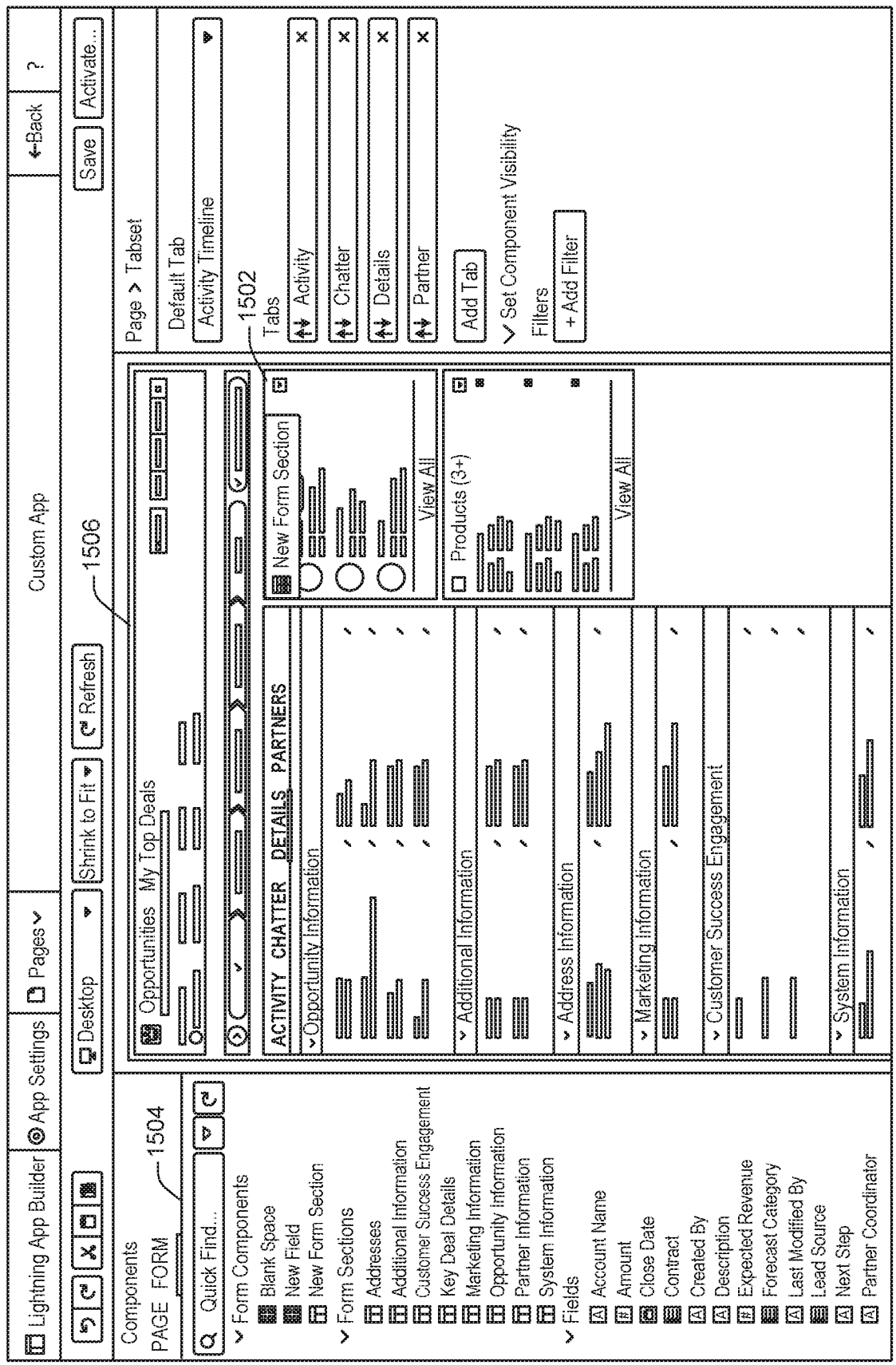
Figure 16:
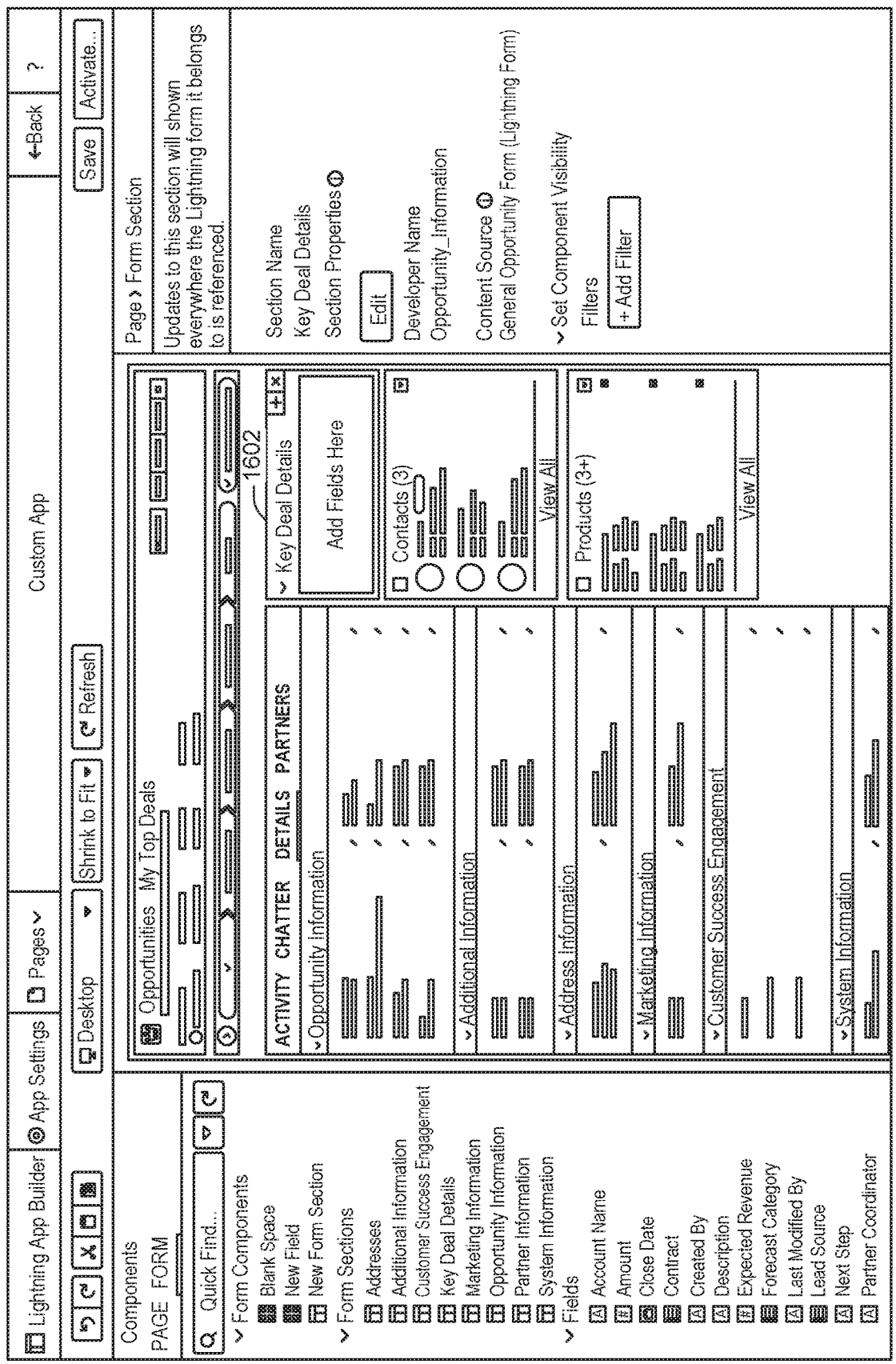

In some implementations, a new section may also be created in a different graphical manner, such as is shown in FIG. 15. For example, the form section 1502 may be created by dragging the graphical form section from the form panel 1504 and arranged in a particular location on the form canvas 1506. An example of a new section created in such a way is shown at 1602 in FIG. 16.

At 408, one or more data fields to included in the identified section are determined. In some implementations, each data field may correspond to a graphical element that is associated with a respective database object field associated with a respective database object.

According to various embodiments, the section may be identified based at least in part on user input. For example, a user may select a field to include. Alternately, or additionally, the fields may be identified based at least in part on an automatic determination performed by the system. For example, the system may identify a database object related to the interactive database object representation and automatically determine one or more fields based on the characteristics of the database object, such as the database fields associated with the database object.

Figure 17:
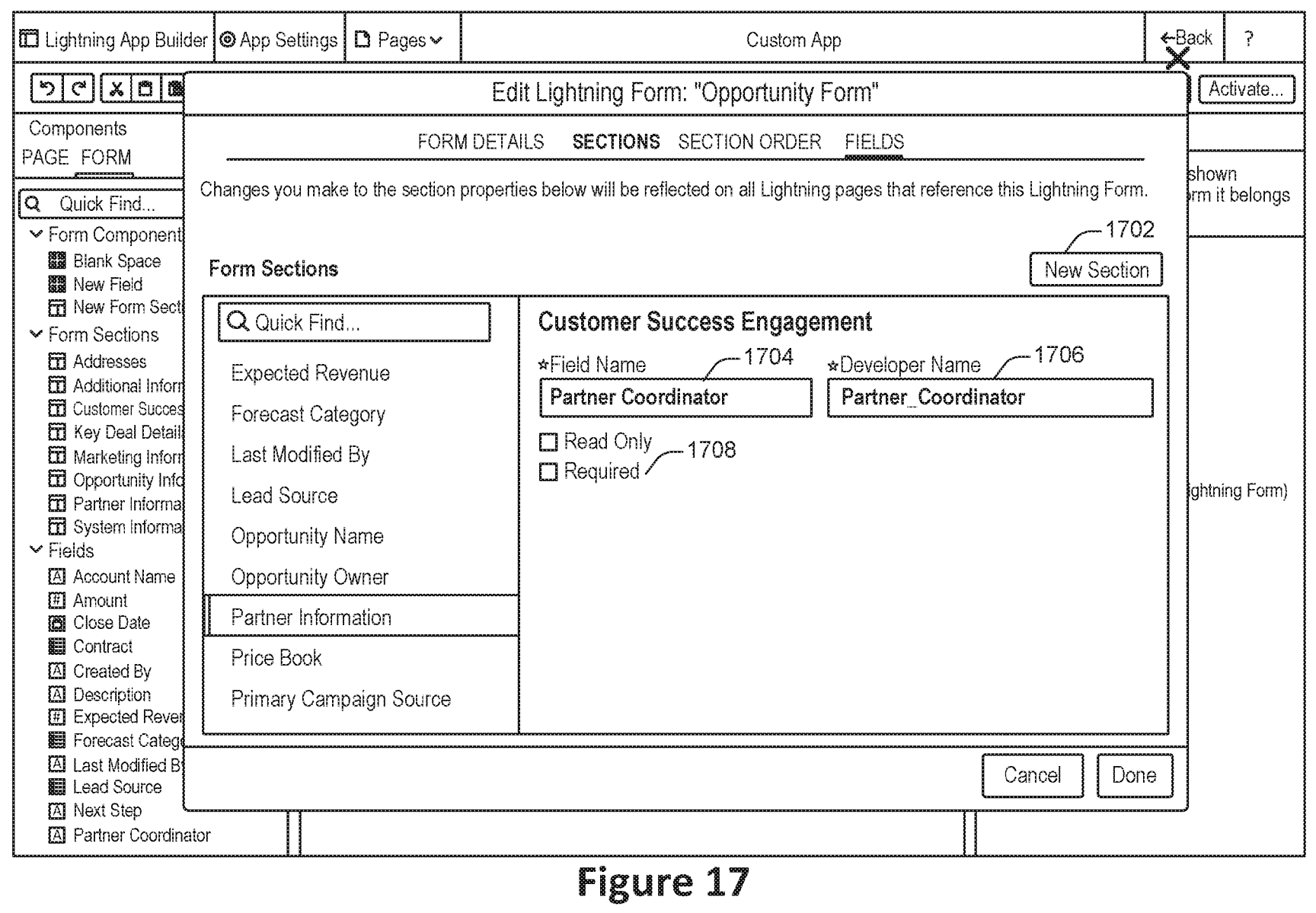

An example of an interface that facilitates the creation and editing of form fields is shown in FIG. 17. A new field may be created at 1702, while client-facing and developer-facing names for the field may be specified at 1704 and 1706. Field-level configuration parameters may be specified at 1708.

At 410, data field location information is determined for the one or more data fields. According to various embodiments, the data field location information may indicate where within a graphical area associated with the section the one or more data fields are to be located.

According to various embodiments, the data field location information may be identified based at least in part on user input. For example, a user may drag and drop a data field from one location to another location. Alternately, or additionally, the data field location information may be determined based at least in part on an automatic determination performed by the system. For example, data fields may be initially ordered based on factors such as ordering information drawn from the database. As another example, data fields that are more commonly changed may be arranged in a more prominent location, such as above, data fields that are less commonly changed.

Figure 18:
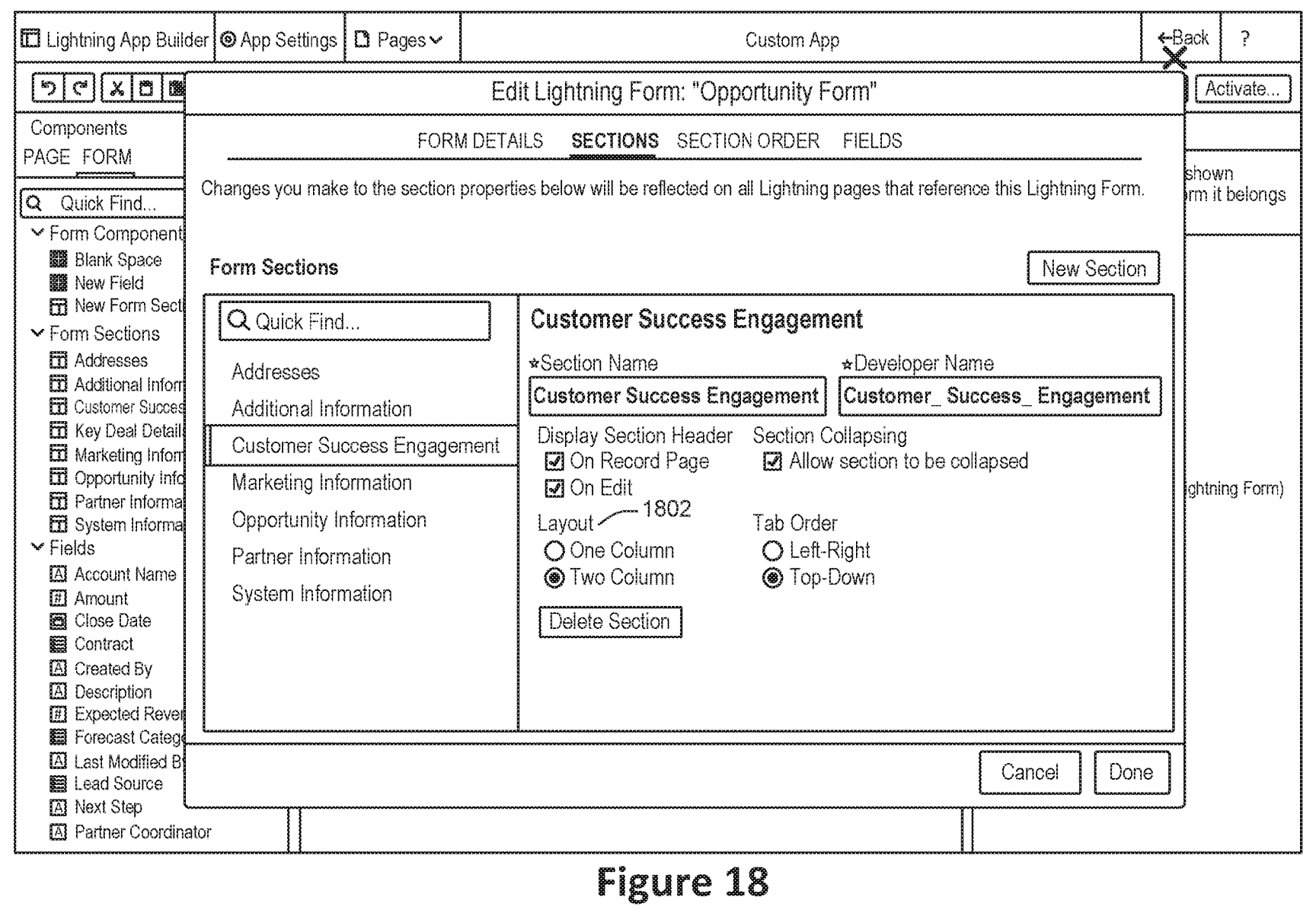
Figure 19:
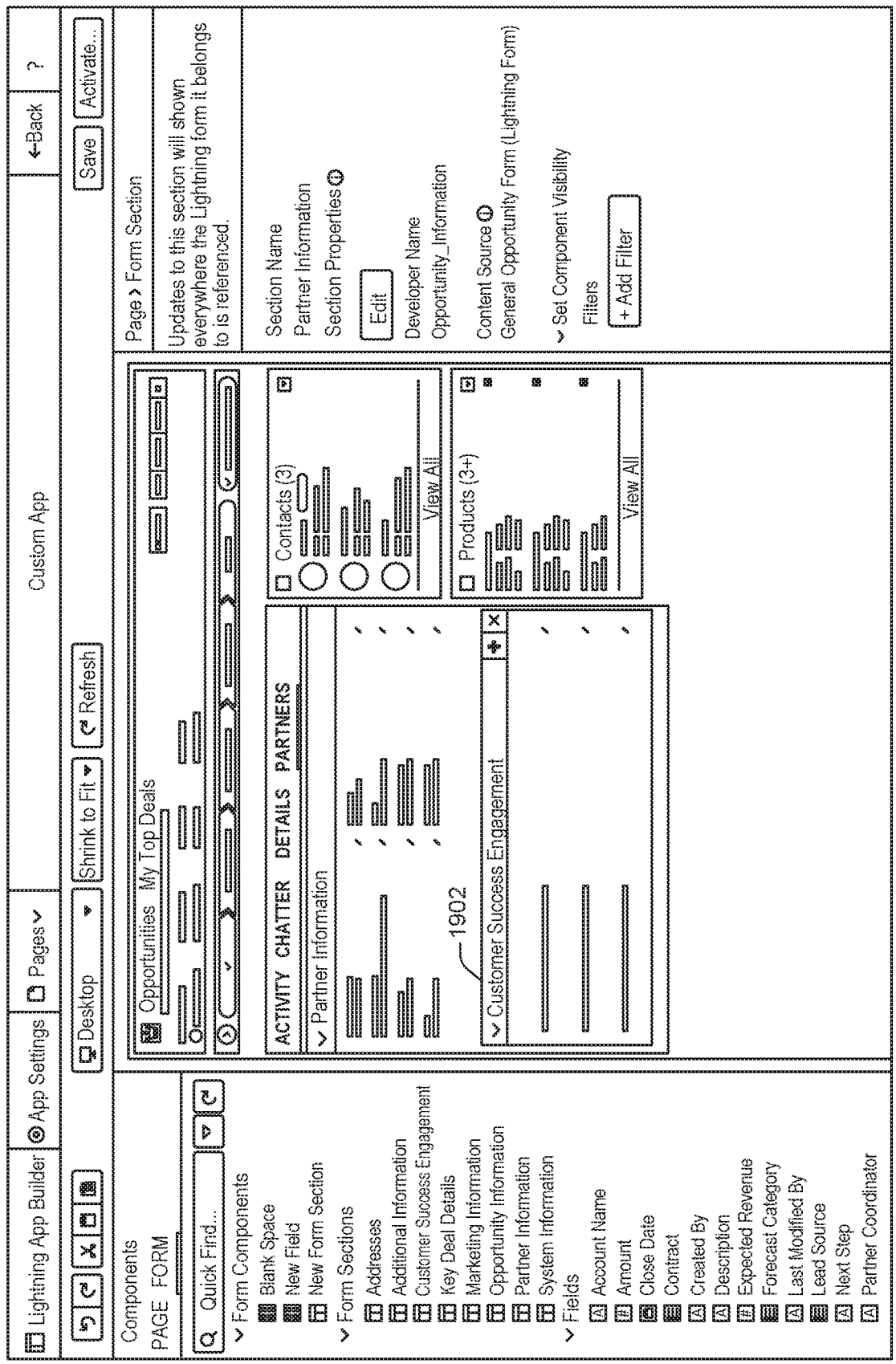
Figure 20:
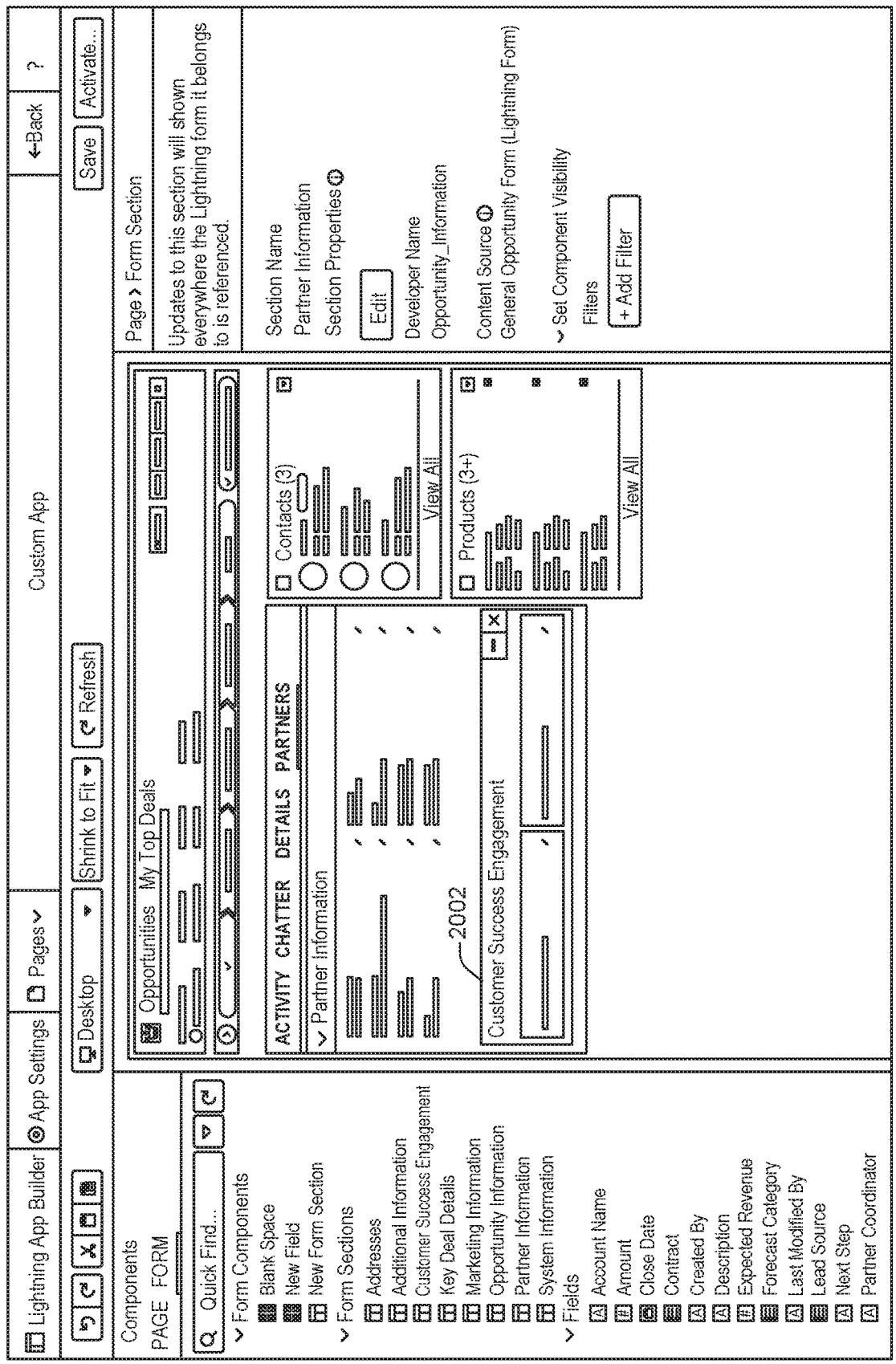

FIG. 18 illustrates an example of one way in which the data field location may be identified. In the user interface shown in FIG. 18, the section layout may be changed between one column and two columns at 1802. When a two-column section layout is used, the data fields may be organized in two columns side-by-side. In other user interfaces, various numbers of columns may be used. An example of a one-column layout is shown in FIG. 19 at 1902, while an example of a two-column layout is shown in FIG. 20 at 2002.

In some implementations, when moving from a one-column layout to a two-column layout, the fields originally in the one-column layout may remain in the first column while the second column remains blank, allowing a user to drag and drop or otherwise move fields from the first column to the second column. Alternately, half of the fields in the first column maybe automatically moved to the second column.

At 412, ordering information for the identified section is determined. According to various embodiments, the ordering information may set the order in which sections appear for newly created and edited record actions.

According to various embodiments, the ordering information may be determined based at least in part on user input. For example, a user may drag and drop a section from one location to another location. Alternately, or additionally, the ordering information may be determined based at least in part on an automatic determination performed by the system. For example, sections may be initially ordered based on factors such as ordering information drawn from the database. As another example, sections that are more commonly edited may be arranged in a more prominent location, such as above, sections that are less commonly edited.

Figure 21:
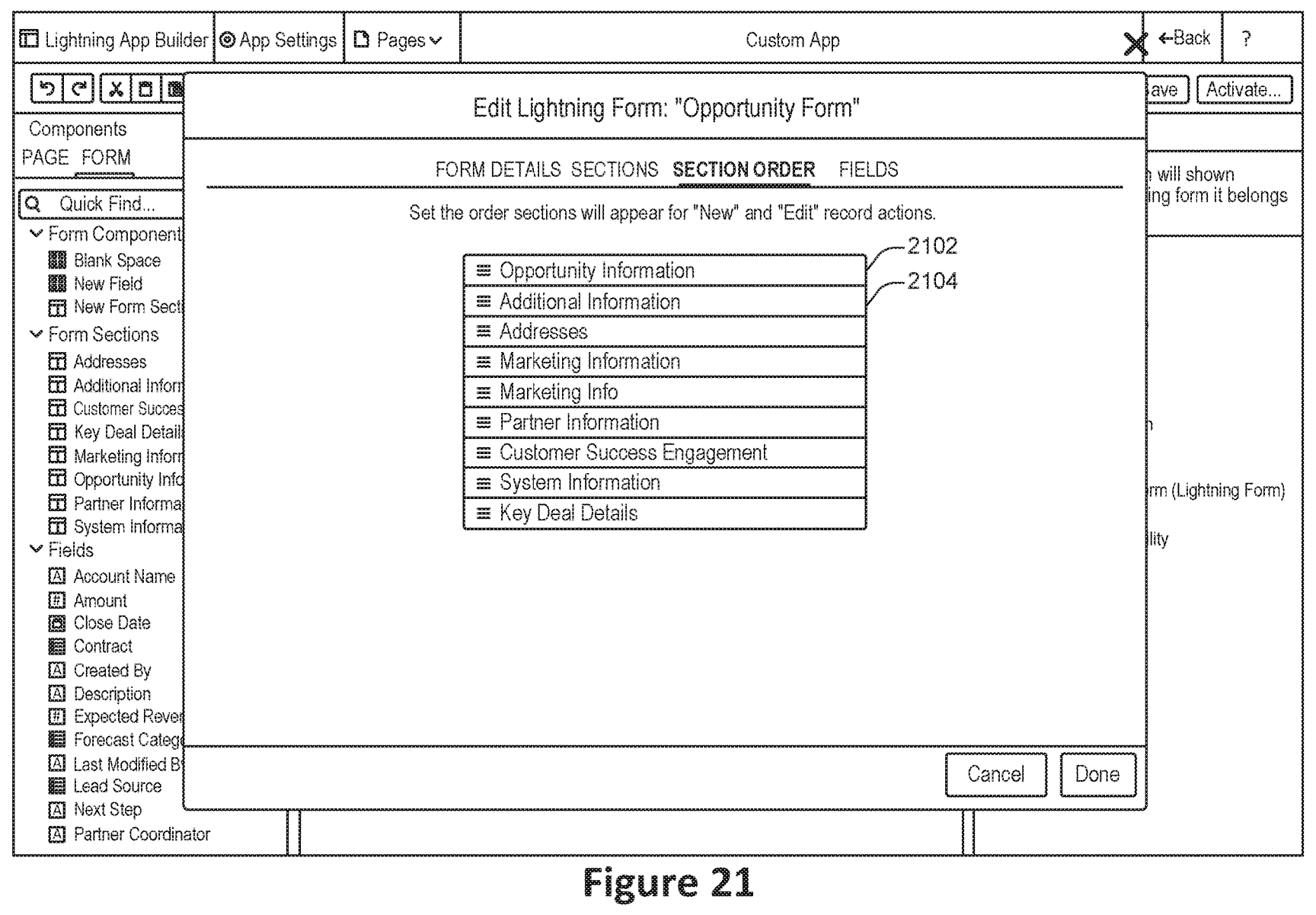

FIG. 21 shows an example of a user interface for specifying section order information. In the user interface shown in FIG. 21, a user may re-order sections by, for example, dragging the opportunity information section 2102 below the additional information section 2104.

At 414, a determination is made as to whether to create an additional section. In some implementations, additional sections may be created whenever a user submits a request to create an additional section. Alternately, the system may automatically generate a request to create an additional section, for instance with a database object is associated with data fields that are not yet represented in the interactive database object representation.

At 416, arrangement information is determined for arranging the identified sections on a canvas. According to various embodiments, the term canvas is used herein to describe a portion of a graphical user interface that contains one or more graphical representations of sections.

Figure 22:
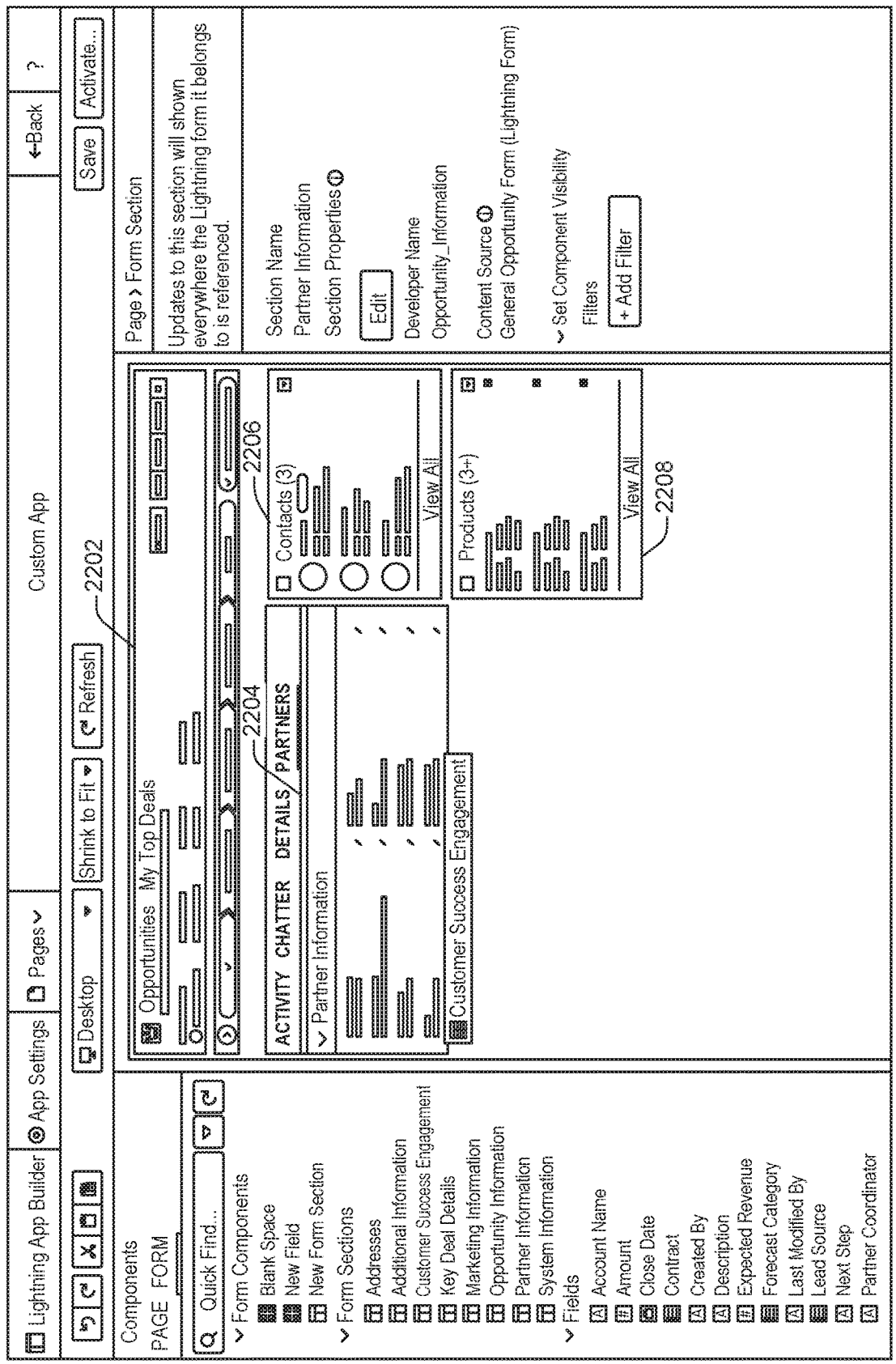
Figure 23:
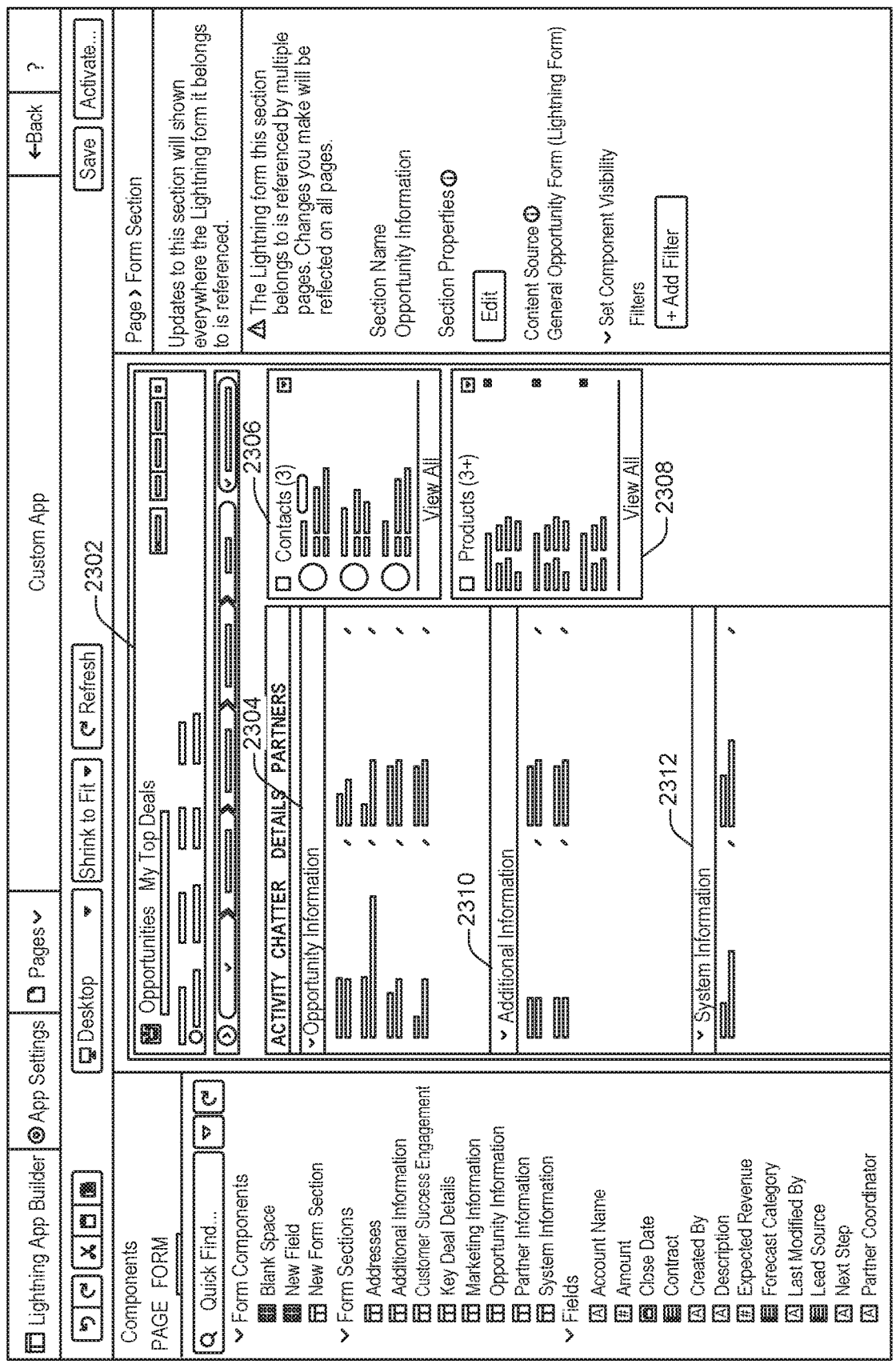
Figure 24:
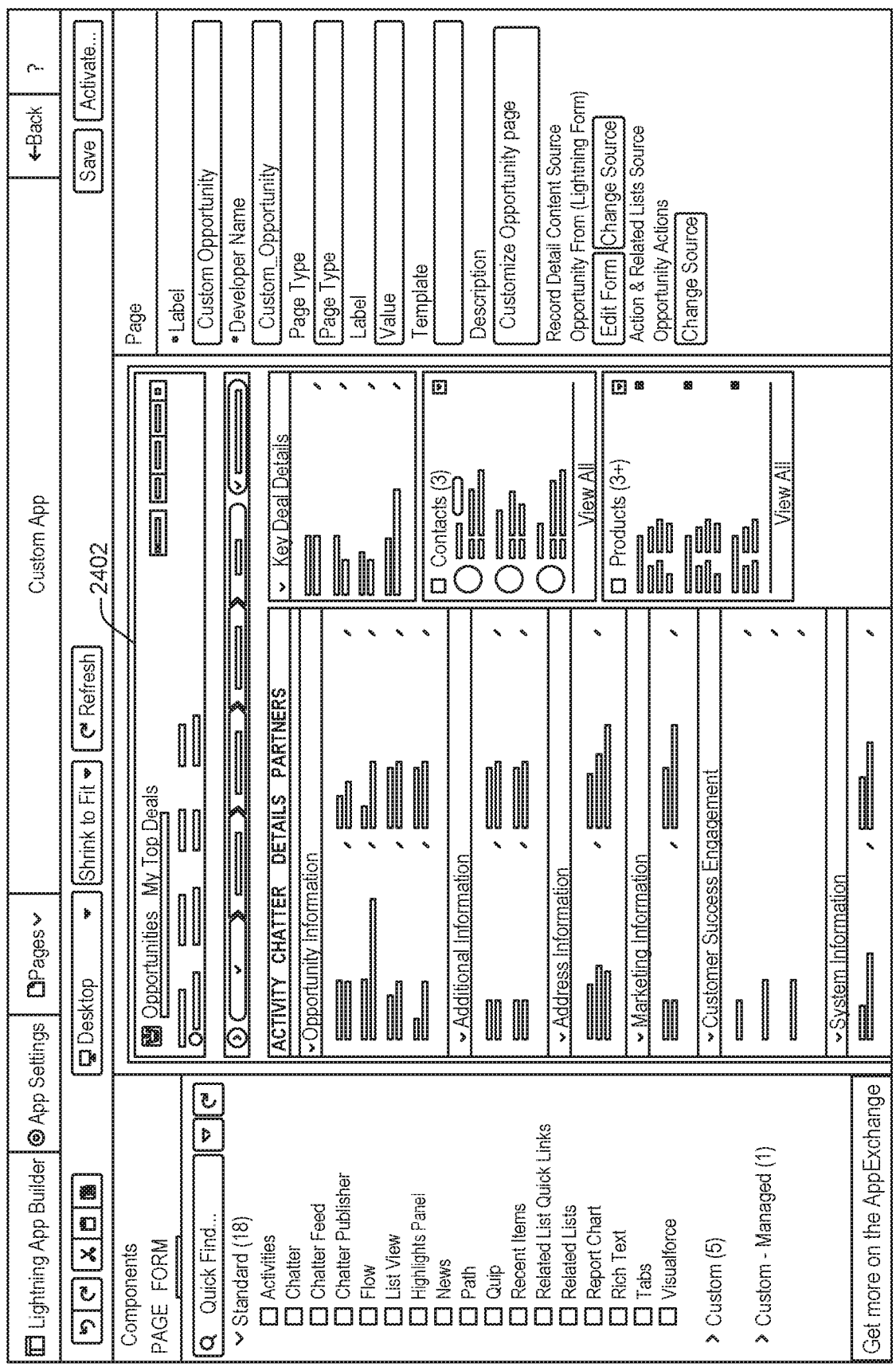
Figure 25:
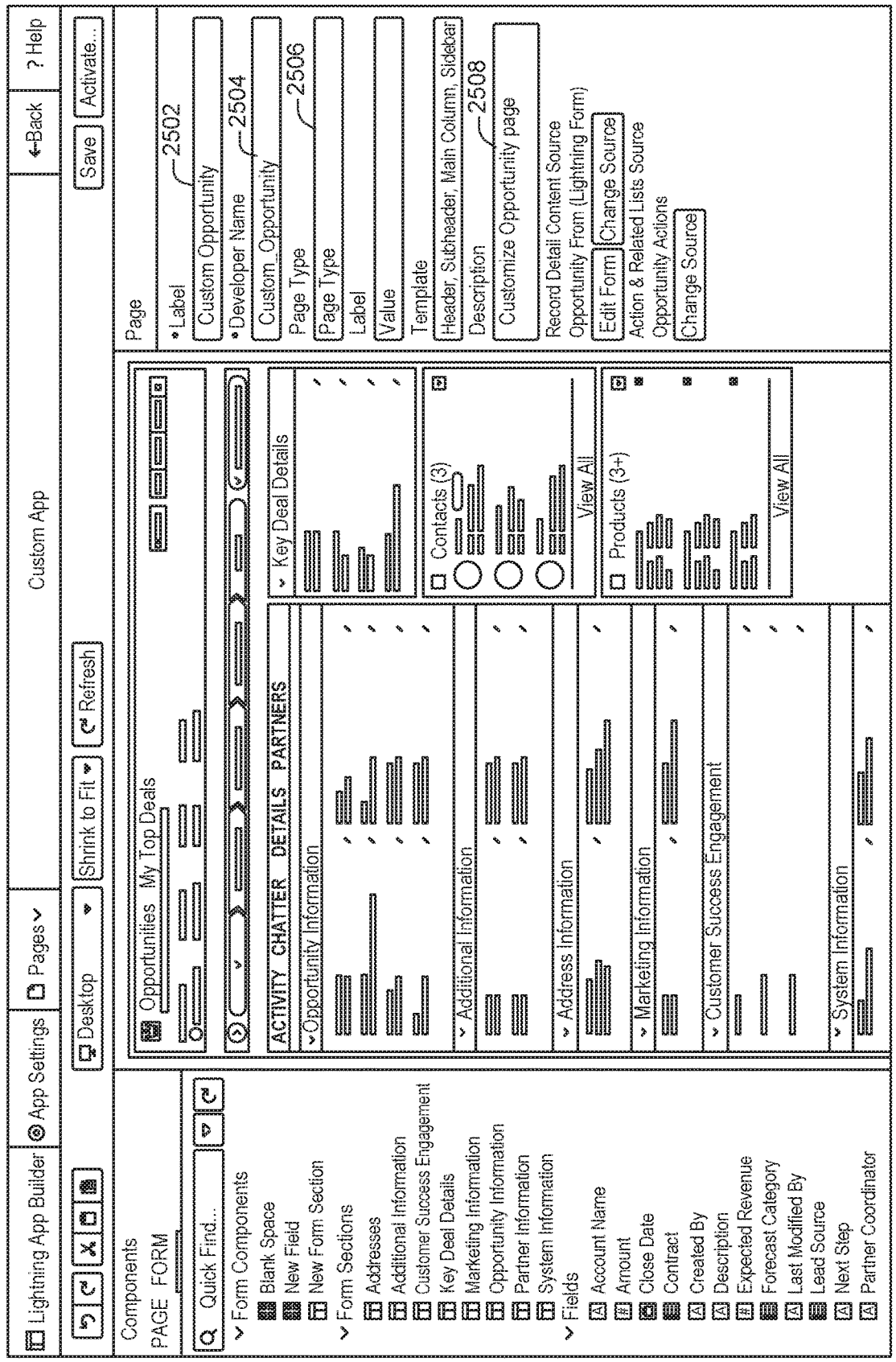

FIG. 22 shows an example of a canvas 2202 that includes graphical representations of sections 2204, 2206, and 2208. FIG. 23 shows another example of a canvas 2302 that includes graphical representations of sections 2304, 2306, 2308, 2310, and 2312. FIG. 24 shows another example of a canvas 2402. A user may drag and drop such graphical representations into a suitable location. Alternately, the system may automatically arrange such graphical representations, for instance as a default setting before the user has provided input.

At 418, the interactive database object representation is published. According to various embodiments, publishing the interactive database object representation may involve operations such as generating markup language code and/or computer programming language code for presenting the interactive database object representation in a web browser or native application. In some implementations, the interactive database object representation may be published for presentation in more than one context, such as at a high resolution for presentation on a desktop or laptop screen and at a lower resolution for presentation on the screen of a smartphone.

In some implementations, the publication of the interactive database object representation may involve the identification of any of various types of metadata associated with the published interactive database object representation, which may also be referred to herein as a page. Examples of such information are included in the user interface shown in FIG. 25. Such information may include, but is not limited to: a page label 2502, a developer-facing page identifier 2504, a page type 2506, and a page description 2508.

Figure 26:
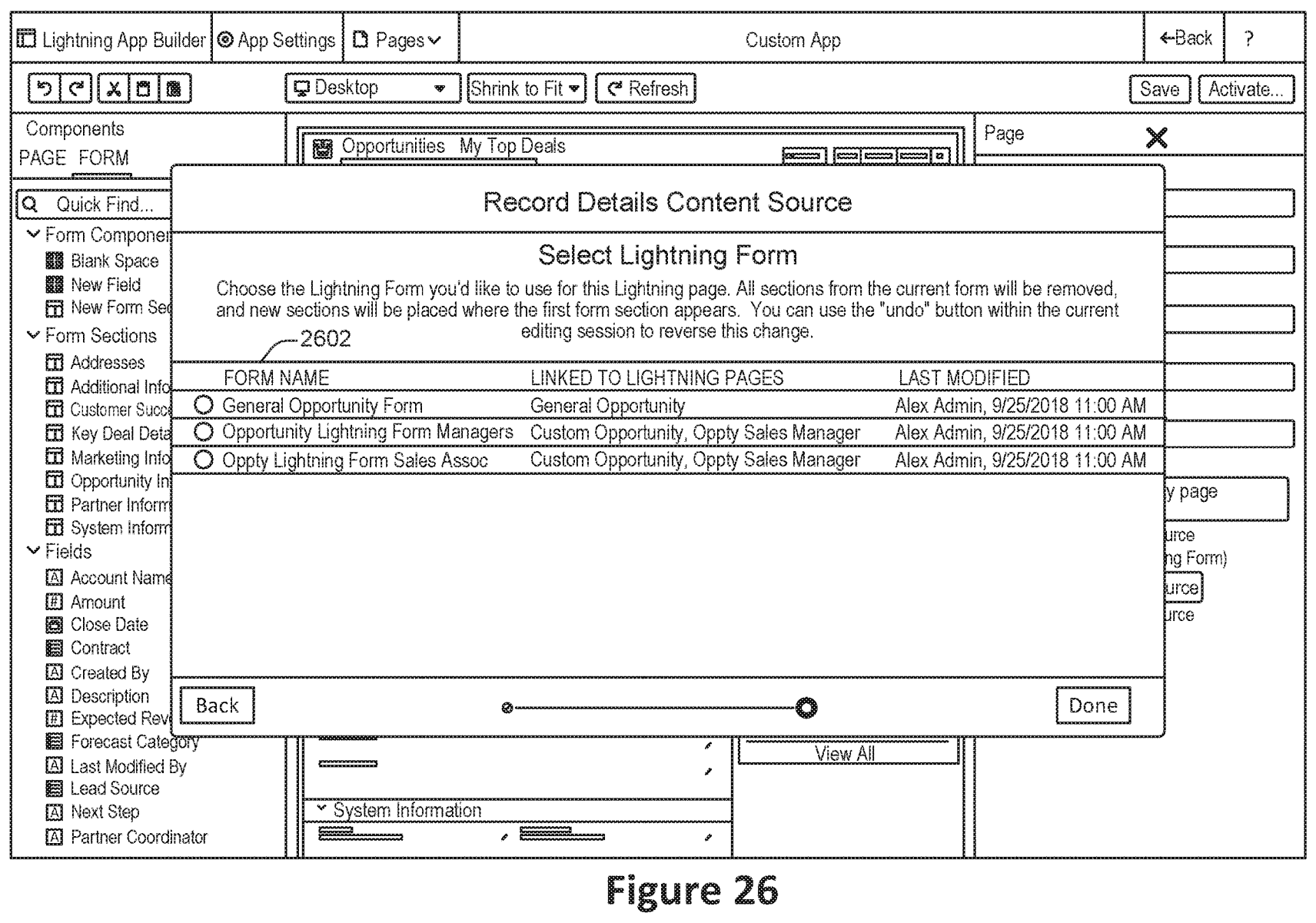

In particular embodiments, the publication of the interactive database object representation may involve the selection of a particular version for presentation. For example, an interactive database object representation may be associated with more than one published page. FIG. 26 shows an example of a user interface 2602 in which a user may select the published page with which to access a database object.

According to various embodiments, the method 400 may be performed while omitting one or more of the operations shown in FIG. 4. Alternately, or additionally, other operations may be performed in addition to those shown in FIG. 4.

In some implementations, operations shown in FIG. 4 may be performed in an order different than that shown. For example, sections and fields may be interchangeably added, deleted, ordered, and edited in any suitable order, for instance via a graphical user interface.

Figure 28:
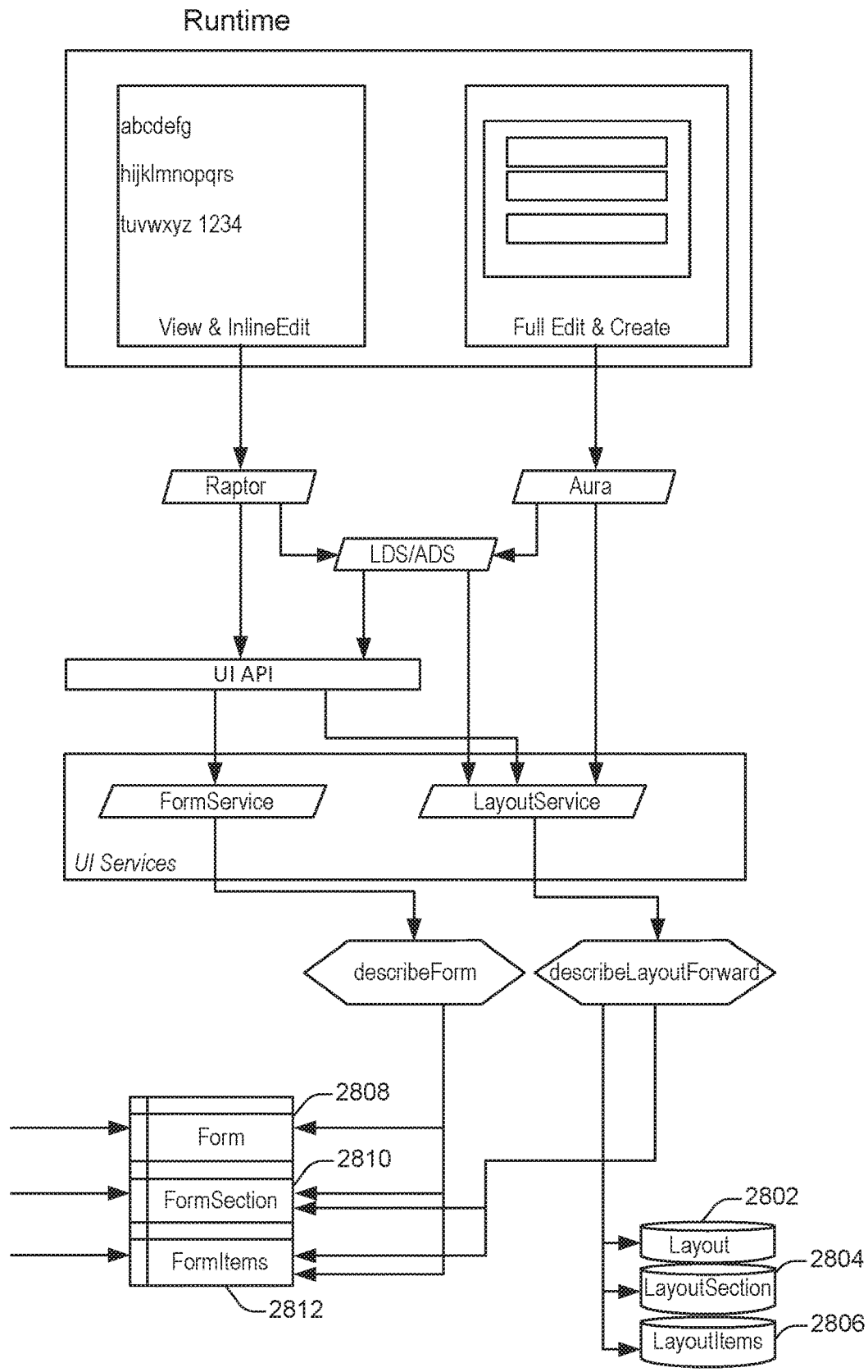
FIG. 28 illustrates a graphical overview of relationships between components and services, configured in accordance with one or more embodiments.

FIG. 28 illustrates a graphical overview of relationships between components and services, configured in accordance with one or more embodiments. Techniques and mechanisms described herein provide for improved page layout representations of one or more database objects. According to various embodiments, a graphical user interface may allow for drag and drop positioning of fields, sections, and other components that reveal information about instances of database objects. Component visibility may be dynamic, for instance controlled by contextual rules that may be specified by a user.

According to various embodiments, dynamic layouts may be provided at least in part by backend entities such as Layout 2802, Layout Section 2804, LayoutItem 2806, Form 2808, FormSection 2810, and FormItem 2812. The Form, FormSection, and FormItem entities may differ from conventional Layout entities because the Form and FormSection are addressable by stable developer names. Form, FormSection, and FormItem may also be updateable via a Setup API system (also referred to as Metadata and Tooling APIs). Such an approach allows developers to create design-time capability (components) from Form, FormSection, and FormItem metadata which allows the system to take advantage of existing functionality when constructing dynamic page layouts. Such an approach may also allow Sections to appear in different regions of a dynamic page, which may function as a container for the Form, FormSection (e.g., section), and FormItems (e.g., fields).

In some implementations, sections and fields may act as different components on the dynamic page and provide various types of design-time functionality. In contrast to conventional techniques, more than one of the same section and/or item may appear on the same dynamic page. Further, sections, items, and other components may be conditionally visible based upon information such as characteristics of data associated with an instance of a database object, contextual information such as time of day or day of the week, or any other suitable criteria. The display of sections and items may therefore be responsive to the specific context in which they are presented and need not be fixed. For example, one or more components of an interactive user interface may be shown if and only if a designated field has stored therein a value that meets one or more criteria. As another example, one or more components of an interactive user interface may be shown if and only the interactive user interface is presented in a particular context, such as on the desktop via a browser or on a mobile device via a native application.

In particular embodiments, sections and items may co-exist with legacy record details presented via conventional static techniques. At runtime, the Form, FormSection, and FormItem metadata can be displayed in any suitable custom-built UI.

Figure 5A:
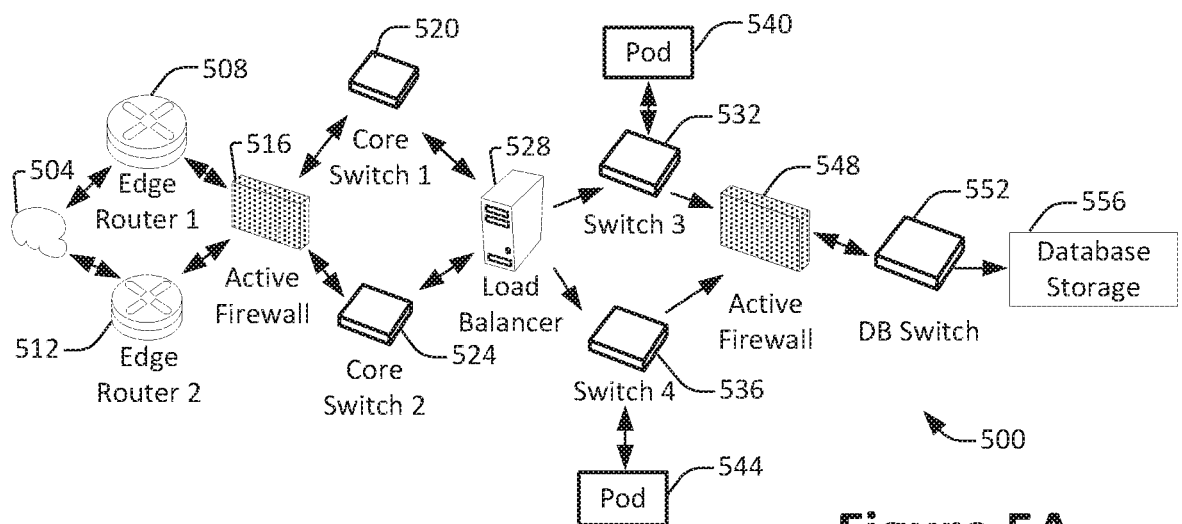
FIG. 5A shows a system diagram of an example of architectural components of an on-demand database service environment, configured in accordance with some implementations.

FIG. 5A shows a system diagram of an example of architectural components of an on-demand database service environment 500, configured in accordance with some implementations. A client machine located in the cloud 504 may communicate with the on-demand database service environment via one or more edge routers 508 and 512. A client machine can be any of the examples of user systems 212 described above. The edge routers may communicate with one or more core switches 520 and 524 via firewall 516. The core switches may communicate with a load balancer 528, which may distribute server load over different pods, such as the pods 540 and 544 by communication via pod switches 532 and 536. The pods 540 and 544, which may each include one or more servers and/or other computing resources, may perform data processing and other operations used to provide on-demand services. Components of the environment may communicate with a database storage 556 via a database firewall 548 and a database switch 552.

Accessing an on-demand database service environment may involve communications transmitted among a variety of different components. The environment 500 is a simplified representation of an actual on-demand database service environment. For example, some implementations of an on-demand database service environment may include anywhere from one to many devices of each type. Also, the on-demand database service environment need not include each device shown, or may include additional devices not shown, in FIGS. 5A and 5B. One or more of the devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

The cloud 504 refers to any suitable data network or combination of data networks, which may include the Internet. Client machines located in the cloud 504 may communicate with the on-demand database service environment to access services provided by the on-demand database service environment. For example, client machines may access the on-demand database service environment to retrieve, store, edit, and/or process information.

In some implementations, the edge routers 508 and 512 route packets between the cloud 504 and other components of the on-demand database service environment 500. The edge routers 508 and 512 may employ the Border Gateway Protocol (BGP). The edge routers 508 and 512 may maintain a table of IP networks or 'prefixes', which designate network reachability among autonomous systems on the internet.

In one or more implementations, the firewall 516 may protect the inner components of the environment 500 from internet traffic. The firewall 516 may block, permit, or deny access to the inner components of the on-demand database service environment 500 based upon a set of rules and other criteria. The firewall 516 may act as one or more of a packet filter, an application gateway, a stateful filter, a proxy server, or any other type of firewall.

In some implementations, the core switches 520 and 524 are high-capacity switches that transfer packets within the environment 500. The core switches 520 and 524 may be configured as network bridges that quickly route data between different components within the on-demand database service environment. In some implementations, the use of two or more core switches 520 and 524 may provide redundancy and/or reduced latency.

In some implementations, communication between the pods 540 and 544 may be conducted via the pod switches 532 and 536. The pod switches 532 and 536 may facilitate communication between the pods 540 and 544 and client machines, for example via core switches 520 and 524. Also, the pod switches 532 and 536 may facilitate communication between the pods 540 and 544 and the database storage 556. The load balancer 528 may distribute workload between the pods, which may assist in improving the use of resources, increasing throughput, reducing response times, and/or reducing overhead. The load balancer 528 may include multilayer switches to analyze and forward traffic.

In some implementations, access to the database storage 556 may be guarded by a database firewall 548, which may act as a computer application firewall operating at the database application layer of a protocol stack. The database firewall 548 may protect the database storage 556 from application attacks such as structure query language (SQL) injection, database rootkits, and unauthorized information disclosure. The database firewall 548 may include a host using one or more forms of reverse proxy services to proxy traffic before passing it to a gateway router and/or may inspect the contents of database traffic and block certain content or database requests. The database firewall 548 may work on the SQL application level atop the TCP/IP stack, managing applications' connection to the database or SQL management interfaces as well as intercepting and enforcing packets traveling to or from a database network or application interface.

In some implementations, the database storage 556 is an on-demand database system shared by many different organizations. The on-demand database service may employ a single-tenant approach, a multi-tenant approach, a virtualized approach, or any other type of database approach. Communication with the database storage 556 may be conducted via the database switch 552. The database storage 556 may include various software components for handling database queries. Accordingly, the database switch 552 may direct database queries transmitted by other components of the environment (e.g., the pods 540 and 544) to the correct components within the database storage 556.

Figure 5B:
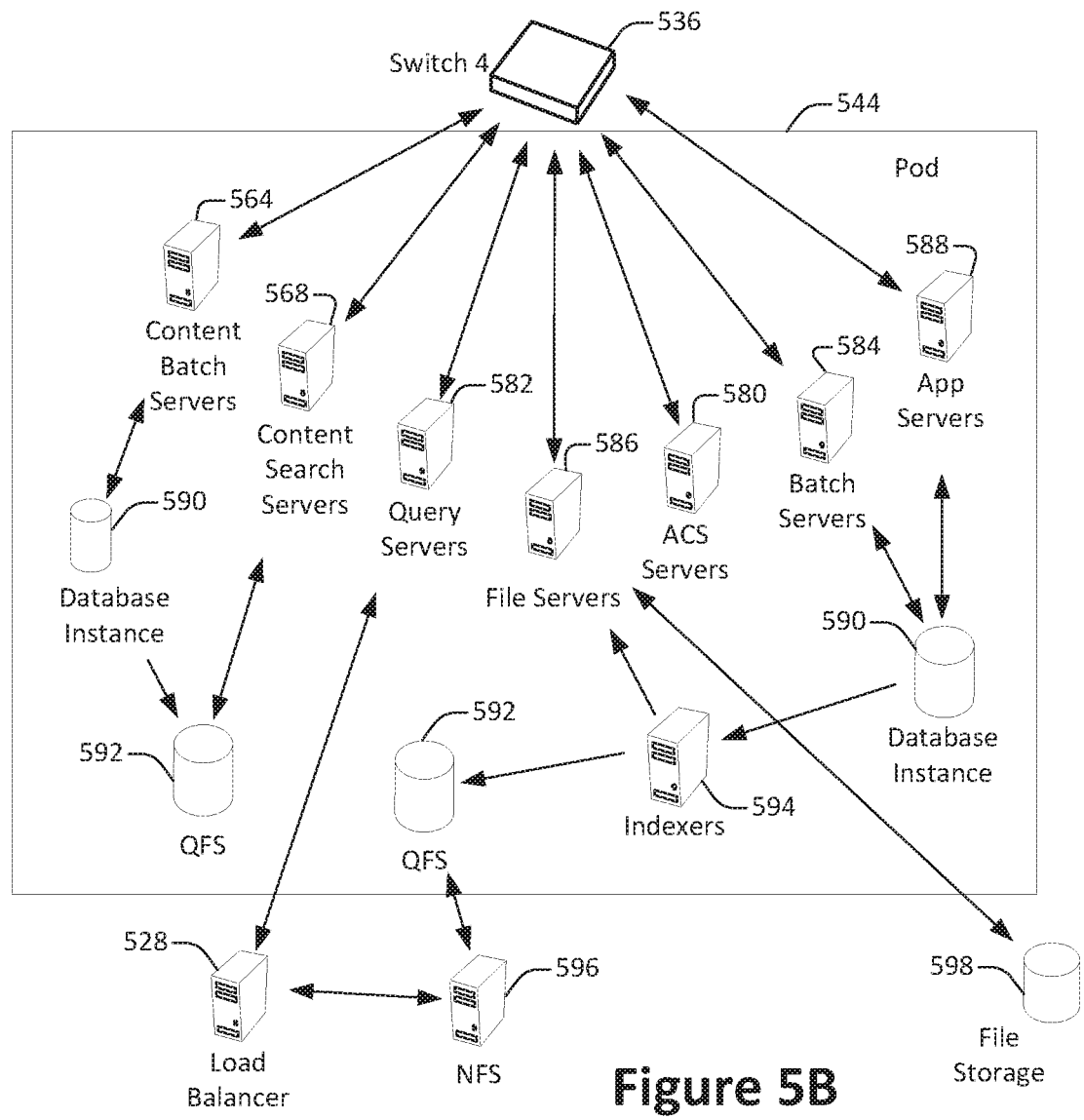
FIG. 5B shows a system diagram further illustrating an example of architectural components of an on-demand database service environment, in accordance with some implementations.

FIG. 5B shows a system diagram further illustrating an example of architectural components of an on-demand database service environment, in accordance with some implementations. The pod 544 may be used to render services to a user of the on-demand database service environment 500. The pod 544 includes one or more content batch servers 564, content search servers 568, query servers 582, file servers 586, access control system (ACS) servers 580, batch servers 584, and app servers 588. Also, the pod 544 includes database instances 590, quick file systems (QFS) 592, and indexers 594. Some or all communication between the servers in the pod 544 may be transmitted via the switch 536.

In some implementations, the app servers 588 may include a framework dedicated to the execution of procedures (e.g., programs, routines, scripts) for supporting the construction of applications provided by the on-demand database service environment 500 via the pod 544. One or more instances of the app server 588 may be configured to execute all or a portion of the operations of the services described herein.

In some implementations, the pod may include one or more database instances 590. The database instance 590 may be configured as a multi-tenant environment in which different organizations share access to the same database. Database information may be transmitted to the indexer 594, which may provide an index of information available in the database 590 to file servers 586. The QFS 592 or other suitable filesystem may serve as a rapid-access file system for storing and accessing information available within the pod 544. The QFS 592 may support volume management capabilities, allowing many disks to be grouped together into a file system. The QFS system may communicate with one or more database instances 590, content search servers 568 and/or indexers 594 to identify, retrieve, move, and/or update data stored in the network file systems 596 and/or other storage systems.

In some implementations, one or more query servers 582 may communicate with the NFS 596 to retrieve and/or update information stored outside of the pod 544. The NFS 596 may allow servers located in the pod 544 to access information to access files over a network in a manner similar to how local storage is accessed. Queries from the query servers 522 may be transmitted to the NFS 596 via the load balancer 528, which may distribute resource requests over various resources available in the on-demand database service environment. The NFS 596 may also communicate with the QFS 592 to update the information stored on the NFS 596 and/or to provide information to the QFS 592 for use by servers located within the pod 544.

In some implementations, the content batch servers 564 may handle requests internal to the pod. These requests may be long-running and/or not tied to a particular customer, such as requests related to log mining, cleanup work, and maintenance tasks. The content search servers 568 may provide query and indexer functions such as functions allowing users to search through content stored in the on-demand database. The file servers 586 may manage requests for information stored in the file storage 598, which may store information such as documents, images, and basic large objects (BLOBs). The query servers 582 may be used to retrieve information from one or more file systems. For example, the query system 582 may receive requests for information from the app servers 588 and then transmit information queries to the NFS 596 located outside the pod. The ACS servers 580 may control access to data, hardware resources, or software resources called upon to render services provided by the pod. The batch servers 584 may process batch jobs, which are used to run tasks at specified times. Thus, the batch servers 584 may transmit instructions to other servers, such as the app servers 588, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

Figure 6:
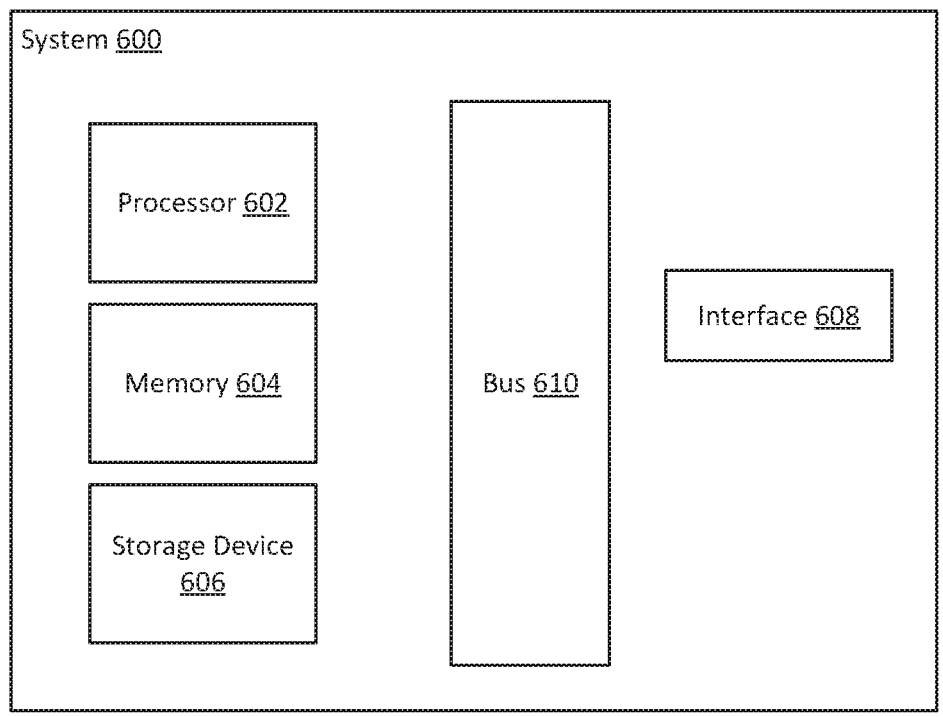
FIG. 6 illustrates one example of a computing device, configured in accordance with one or more embodiments.

FIG. 6 illustrates one example of a computing device. According to various embodiments, a system 600 suitable for implementing embodiments described herein includes a processor 602, a memory module 604, a storage device 606, an interface 608, and a bus 610 (e.g., a PCI bus or other interconnection fabric) and operates as an application server, a database server, or any other device or service described herein. Although a particular server is described, a variety of alternative configurations are possible. The processor 602 may perform operations such as those described herein. Instructions for performing such operations may be embodied in the memory 604, on one or more non-transitory computer readable media, or on some other storage device. Various specially configured devices can also be used in place of or in addition to the processor 602. The interface 608 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, Apex, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

Figure 7:
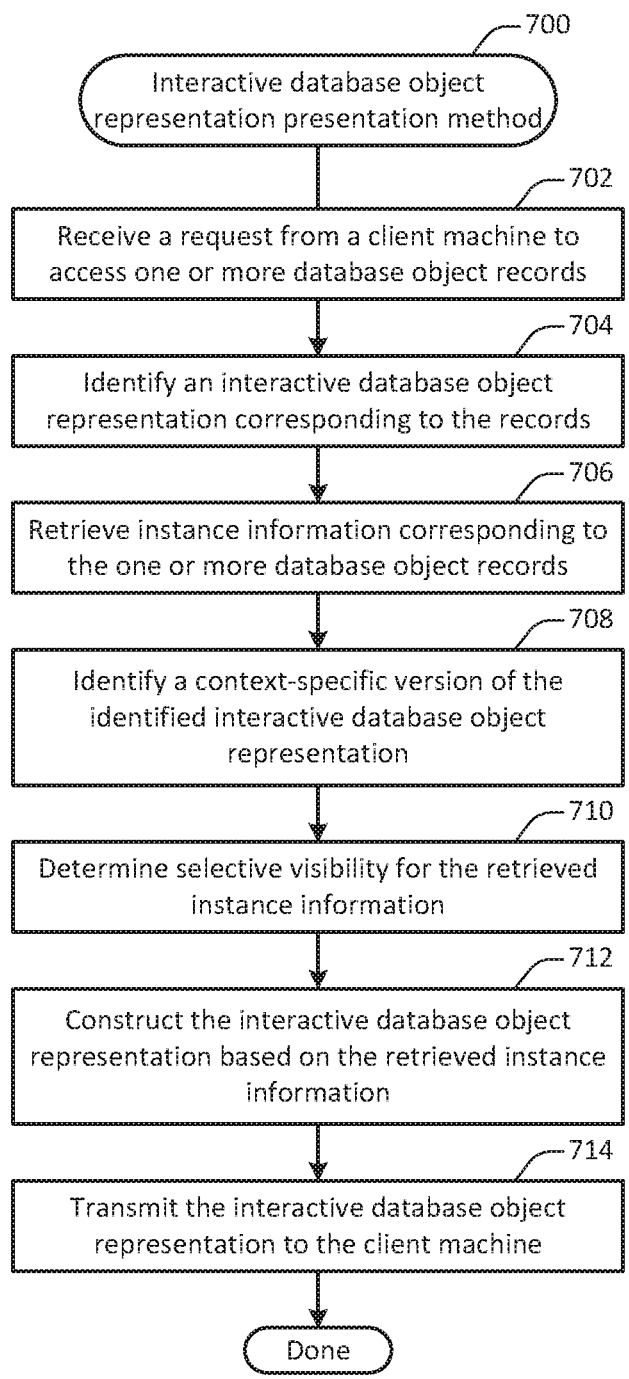
FIG. 7 illustrates an example of a method for presenting an interactive database object representation, performed in accordance with one or more embodiments.
Figure 10:
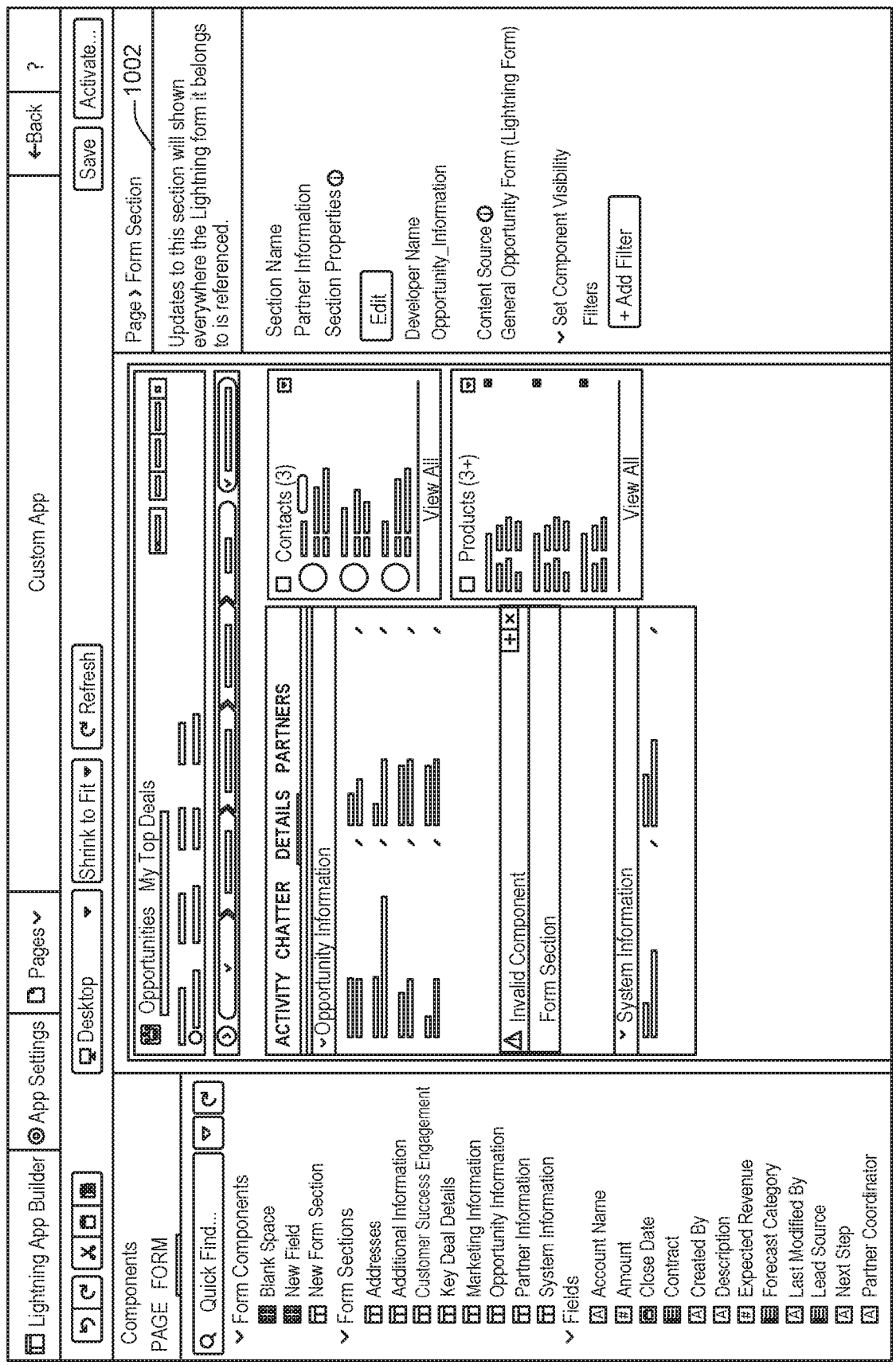

FIG. 7 illustrates an example of a method 700 for presenting an interactive database object representation, performed in accordance with one or more embodiments. According to various embodiments, the method 700 may be performed by one or more components of an on-demand computing services environment. For instance, the method 700 may be performed to provide access to an interactive database object representation to a client of the on-demand computing services environment.

At 702, a request is received from a client machine to access one or more database object records. In some implementations, the request may be associated with a communications session between the client machine and the computing services environment in which the client machine has verified an identity of an entity authorized to access database records. The request may identify one or more database records to access.

An interactive database object representation corresponding with the records is identified at 704. According to various embodiments, the interactive database object representation may be identified by determining a type of the one or more database object records and an appropriate representation of those records, such as a representation created via the method 400 shown in FIG. 4.

In some instances, the identified representation may be the one most specific to the identified context. For example, the client machine may be associated with a user identity, which may be included within a group, which may be a part of an organization. If the user is associated with a user-specific customized database object representation, then that user-specific representation may be identified. If instead the user is not associated with a user-specific representation, then the system may proceed up the hierarchy to retrieve a group-specific, organization-specific, or general-purpose representation, depending on which are available.

Instance information corresponding to the one or more database object records is retrieved at operation 706. In some implementations, the instance information may be retrieved by querying the database for the database records identified as part of the request received at operation 702. The instance information may include, for example, one or more field values corresponding to data fields associated with the identified database records.

A context-specific version of the identified interactive database object representation is identified at operation 706. In some implementations, the context may be determined based on information such as the type of client machine from which the request is received, the time of day, the characteristics of the instance information retrieved at operation 706, or any other suitable information. For example, a mobile version of the interactive database object representation may be retrieved if the client machine is a mobile device and the request is received via a mobile app, while a web-based version of the interactive database object representation may be retrieved if the client machine is a desktop or laptop and the request is received via a web browser. As another example, the context-specific version that is identified may vary based on whether one or more fields associated with the record exhibits a designated value or values.

Selective visibility information is determined at 710. According to various embodiments, the selective visibility information may be determined based on any suitable contextual information. For example, depending on the time of day, a field may be displayed or not displayed. As another example, a component including several fields may be displayed or not displayed based on whether a particular field is storing a designated value. For instance, a component including detailed information may be presented if and only if a "high-value customer" field is set.

The interactive database object representation is constructed at operation 712 and transmitted to the client machine at operation 714. According to various embodiments, the interactive database object representation may be constructed in a manner specific to the context. For example, in the case of a web-based representation, an interactive webpage may be created. As another example, in the case of a mobile app, information suitable for generating the representation at the mobile app may be packaged for transmission to the client machine.

According to various embodiments, one or more of the operations shown in FIG. 7 may be omitted, or may be performed in an order different than that shown. For example, an interactive database object representation may not be associated with a context-specific version. As another example, an interactive database object representation may not include any selectively visible fields.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present invention unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include multi-tenant database systems. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
receiving at a communications interface a representation configuration message including an instruction to configure an interactive database object representation associated with a database table in a database system accessible via an on-demand computing services environment managed by a service provider, the service provider providing computing services through the on-demand computing services environment via a network to a plurality of clients, the instruction identifying a designated one of a plurality of database fields associated with the database table;
creating the interactive database object representation via a processor based on the instruction, the interactive database object representation including a graphical element representing the designated database field;
publishing the interactive database object representation to a storage medium in association with a designated one of the plurality of clients;
receiving a request to access an instance of a database object stored in the database table from a client machine associated with the designated client; and
transmitting to the client machine an instance of the interactive database object representation that includes a database entry value for the instance of the database object and corresponding with the designated database field, the interactive database object representation providing a graphical representation of the instance of the database object through which the database entry value can be updated.

2. The method recited in claim 1, wherein the instruction includes layout information indicating a graphical location for the graphical element.

3. The method recited in claim 1, wherein the instruction includes grouping information, the grouping information identifying a plurality of graphical elements for inclusion in a designated group, the plurality of the graphical elements being included in a shared area of the interactive database object representation.

4. The method recited in claim 1, wherein the database is accessible via an on-demand computing services environment managed by a service provider, the service provider providing computing services through the on-demand computing services environment via a network to a plurality of clients.

5. The method recited in claim 4, wherein the database is a multi-tenant database shared by two or more of the plurality of clients.

6. The method recited in claim 4, wherein the database stores customer relations management information for the plurality of clients, each client having associated therewith a respective plurality of customers.

7. The method recited in claim 1, wherein publishing the interactive database object representation involves formatting the interactive database object for each of a plurality of transmission formats, each transmission format designated a respective screen resolution.

8. A computing device comprising:
a communications interface configurable to receive a representation configuration message including an instruction to configure an interactive database object representation representing a database object definition in a database system, the instruction identifying a designated one of a plurality of database fields associated with the database object definition;
a processor configurable to create the interactive database object representation based on the instruction, the interactive database object representation including a graphical element representing the designated database field;
a storage device configured to store the interactive database object representation in association with a designated one of a plurality of organizations accessing the database system, wherein the communications interface is further operable to receive a request to access an instance of the database object definition from a client machine associated with the designated organization and to transmit to the client machine an instance of the interactive database object representation that includes a database entry value corresponding with the designated database field.

9. The method recited in claim 8, wherein the instruction includes layout information indicating a graphical location for the graphical element.

10. The computing device recited in claim 8, wherein the instruction includes grouping information, the grouping information identifying a plurality of graphical elements for inclusion in a designated group, the plurality of the graphical elements being included in a shared area of the interactive database object representation.

11. The computing device recited in claim 8, wherein the database is accessible via an on-demand computing services environment managed by a service provider, the service provider providing computing services through the on-demand computing services environment via a network to a plurality of clients.

12. The computing device recited in claim 11, wherein the database is a multi-tenant database shared by two or more of the plurality of clients.

13. The computing device recited in claim 11, wherein the database stores customer relations management information for the plurality of clients, each client having associated therewith a respective plurality of customers.

14. The computing device recited in claim 11, wherein the published interactive database object representation is specific to a designated one of the plurality of clients.

15. One or more non-transitory computer-readable media having instructions stored thereon for performing a method, the method comprising:
   receiving at a communications interface a representation configuration message including an instruction to configure an interactive database object representation representing a database object definition in a database system, the instruction identifying a designated one of a plurality of database fields associated with the database object definition;
   creating the interactive database object representation via a processor based on the instruction, the interactive database object representation including a graphical element representing the designated database field;
   publishing the interactive database object representation to a storage medium in association with a designated one of a plurality of organizations accessing the database system;
   receiving a request to access an instance of the database object definition from a client machine associated with the designated organization; and
   transmitting to the client machine an instance of the interactive database object representation that includes a database entry value corresponding with the designated database field.

16. The one or more non-transitory computer-readable media recited in claim 15, wherein the instructions include layout information indicating a graphical location for a designated one of the graphical elements.

17. The one or more non-transitory computer-readable media recited in claim 15, wherein the instructions include field selection information identifying one or more of the graphical elements for inclusion in the interactive database object representation.

* * * * *